United States Patent
Tanabe et al.

(10) Patent No.: US 10,165,442 B2
(45) Date of Patent: Dec. 25, 2018

(54) TRANSMISSION DEVICE, RECEPTION DEVICE, TRANSMISSION METHOD, AND RECEPTION METHOD

(71) Applicant: Panasonic Intellectual Property Management Co., Ltd., Osaka (JP)

(72) Inventors: Masato Tanabe, Kanagawa (JP); Jun Anzai, Kanagawa (JP); Yoshihiko Kitamura, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 165 days.

(21) Appl. No.: 15/308,171

(22) PCT Filed: May 25, 2015

(86) PCT No.: PCT/JP2015/002614
§ 371 (c)(1),
(2) Date: Nov. 1, 2016

(87) PCT Pub. No.: WO2015/182103
PCT Pub. Date: Dec. 3, 2015

(65) Prior Publication Data
US 2017/0078884 A1  Mar. 16, 2017

(30) Foreign Application Priority Data

May 29, 2014 (JP) .................................. 2014-110908
Dec. 12, 2014 (JP) .................................. 2014-251551

(51) Int. Cl.
H04L 29/06 (2006.01)
H04W 12/06 (2009.01)
(Continued)

(52) U.S. Cl.
CPC .......... *H04W 12/06* (2013.01); *B60R 16/023* (2013.01); *H04L 9/3242* (2013.01);
(Continued)

(58) Field of Classification Search
None
See application file for complete search history.

(56) References Cited

U.S. PATENT DOCUMENTS 7,631,193 B1 * 12/2009 Hoffman ................. G06F 21/32
382/115
9,749,856 B2 * 8/2017 Van Phan ............... H04W 4/70
(Continued)

FOREIGN PATENT DOCUMENTS

JP  2001-285962  10/2001
JP  2004-229125  8/2004
(Continued)

OTHER PUBLICATIONS

Lim, Sun-Hwa; Lee, Sang-ho. Efficient IMS Authentication Architecture based on Initial Access Authentication in WiBro-Evolution (WiBro-EVO) System. 2007 IEEE 65th Vehicular Technology Conference—VTC2007-Spring. https://ieeexplore.ieee.org/stamp/stamp.jsp?tp=&arnumber=4212623 (Year: 2007).*
(Continued)

*Primary Examiner* — Jeremiah L Avery
(74) *Attorney, Agent, or Firm* — Greenblum & Bernstein, P.L.C.

(57) ABSTRACT

A transmission device has a detector, a generator, and a transmitter. When the detector has detected that a communication rule of a message that has been broadcasted to a network by another transmission device coincides with a communication rule of a message that is broadcasted to the network by the present transmission device, the generator generates an abnormality notification message. Then, the
(Continued)

transmitter broadcasts an abnormality notification message to the network.

4 Claims, 26 Drawing Sheets

(51) Int. Cl.
    *B60R 16/023* (2006.01)
    *H04L 9/32* (2006.01)
    *H04L 12/40* (2006.01)
    *H04L 29/08* (2006.01)
    *H04W 4/40* (2018.01)

(52) U.S. Cl.
    CPC .... *H04L 12/40026* (2013.01); *H04L 63/0876* (2013.01); *H04L 63/1416* (2013.01); *H04L 63/1466* (2013.01); *H04L 67/12* (2013.01); *H04L 2012/40215* (2013.01); *H04L 2012/40273* (2013.01); *H04L 2209/84* (2013.01); *H04W 4/40* (2018.02)

(56) References Cited

U.S. PATENT DOCUMENTS

| | | | | |
|---|---|---|---|---|
| 2002/0053033 A1* | 5/2002 | Cooper | ............... | H04L 41/0681 726/7 |
| 2003/0004688 A1* | 1/2003 | Gupta | ................. | G06F 21/55 702/188 |
| 2004/0205210 A1 | 10/2004 | Hamano | | |
| 2006/0112271 A1 | 5/2006 | Soumiya et al. | | |
| 2008/0076425 A1* | 3/2008 | Khetawat | .............. | H04W 88/12 455/436 |
| 2013/0067552 A1* | 3/2013 | Hawkes | ................ | H04L 63/166 726/7 |
| 2013/0104231 A1* | 4/2013 | Niner | .................. | H04L 63/1416 726/23 |
| 2013/0333009 A1* | 12/2013 | Mackler | .................. | G06F 21/31 726/7 |
| 2014/0310530 A1 | 10/2014 | Oguma et al. | | |
| 2014/0359708 A1* | 12/2014 | Schwartz | ............. | G06F 15/173 726/4 |
| 2015/0058947 A1* | 2/2015 | John | ..................... | H04W 12/06 726/7 |
| 2015/0327063 A1* | 11/2015 | Van Phan | ............... | H04W 4/70 455/411 |

FOREIGN PATENT DOCUMENTS

| | | |
|---|---|---|
| JP | 2006-210995 | 8/2006 |
| JP | 2013-098719 | 5/2013 |
| JP | 2015/002614 | 8/2015 |
| WO | 2014/199687 | 12/2014 |

OTHER PUBLICATIONS

Murvay, Pal-Stefan; Groza, Bogdan. Source Identification Using Signal Characteristics in Controller Area Networks. IEEE Signal Processing Letters, vol. 21, Issue: 4. https://ieeexplore.ieee.org/stamp/stamp.jsp?tp=&arnumber=6730667 (Year: 2014).*
International Search Report of PCT application No. PCT/JP2015/002614 dated Aug. 18, 2015.
The Extended European Search Report dated Mar. 10, 2017 for the related European Patent Application No. 15799886.5.
Tsutomu Matsumoto et al: "A Method of Preventing Unauthorized Data Transmission in Controller Area Network", Dec. 31, 2012 (Dec. 31, 2012), XP002766364, Retrieved from the Internet: URL:http://ieeexplore.ieee.org/stamp/stamp.jsp?arnumber=6240294 [retrieved on Jan. 23, 2017].

* cited by examiner

TRANSMISSION DEVICE, RECEPTION DEVICE, TRANSMISSION METHOD, AND RECEPTION METHOD

TECHNICAL FIELD

The present invention relates to a transmission device and a reception device in a communication system, which are connected by a bus, a transmission method, and a reception method.

BACKGROUND ART

As an in-vehicle network, a CAN (Controller Area Network) is popular. The CAN is a serial communication protocol employing a bus type network. Messages from each node connected to a bus are broadcast to all nodes connected to the bus. The messages do not include identification information of a transmission source node and a destination node. Therefore, in a reception node, it is not possible to simply determine whether the message is a message from a correct communication partner.

In order to ensure integrity of a message and to prevent a replay attack from an unauthorized device connected to the CAN, a method using a message authentication code (MAC) is proposed. For example, there is proposed a method for generating a MAC for an ordinary message, and transmitting the message containing the MAC, each time when generating/transmitting the ordinary message (refer to PTL 1, for example).

CITATION LIST

Patent Literature

PTL 1: Unexamined Japanese Patent Publication No. 2013-98719

SUMMARY OF THE INVENTION

The present invention provides a technique for improving security, while suppressing an increase in load, in a communication system that performs broadcast.

A transmission device according to one aspect of the present invention has a detector, a generator, and a transmitter. The detector detects whether a communication rule of a message held by the present transmission device coincides with a communication rule of a message that has been broadcasted to a network by another transmission device. The generator generates an abnormality notification message for notifying detection of an abnormality. The transmitter broadcasts to the network the message generated by the generator. When the detector has detected that the communication rule of the message that is broadcasted to the network by the present transmission device coincides with a communication rule of a message that has been broadcasted to the network by another transmission device, the generator generates an abnormality notification message, and the transmitter broadcasts this abnormality notification message to the network.

An arbitrary combination of the above configuration elements, and a conversion of expressions of the present invention among methods, devices, systems, computer programs, or recording mediums storing therein computer programs, are also effective as an aspect of the present invention.

According to the present invention, in a communication system that performs broadcast, security can be improved, while suppressing an increase in load.

EXEMPLARY EMBODIMENT

Prior to description of the exemplary embodiment of the present invention, problems of a conventional transmission device will be briefly described. According to the conventional transmission device, a MAC is generated at each time of generating and transmitting an ordinary message. In this case, the load of a node becomes large, and power consumption also increases. Further, because the number of messages increases, a bus occupation rate also increases.

The exemplary embodiment of the present invention relates to an in-vehicle network in which a plurality of ECUs (Electronic Control Units) mounted in a vehicle are connected as nodes, and a message containing a message identifier (ID), data, and a MAC as an authentication code is broadcast. Hereinafter, the exemplary embodiment of the present invention will be described by exemplifying a CAN system as such a network. As described above, the CAN employs a bus type network, and a message from each ECU connected to the bus is broadcast to all ECUs connected to the bus. In recent years, along with a progress of equipment of electronic devices in a vehicle, the number of ECUs mounted in one vehicle and an amount of data handled by the ECUs are increasing, and traffic amount of a CAN bus is also increasing. Further, along with an increase and sophistication of the ECUs, power consumption of batteries is also increasing.

Figure 1:
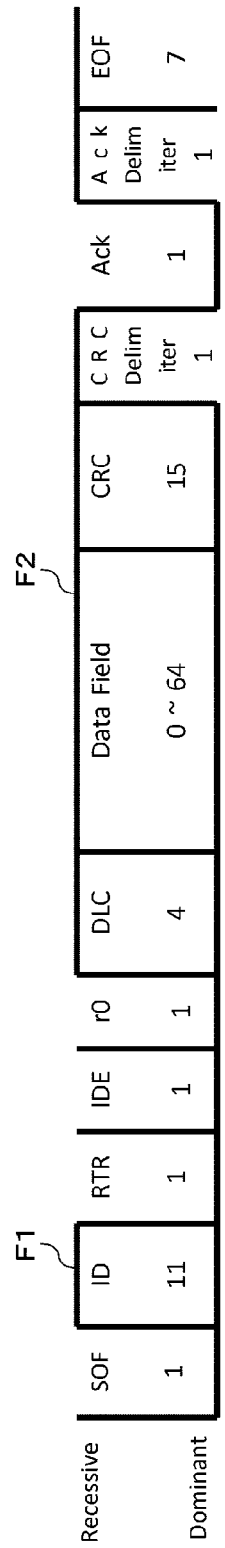
FIG. 1 is a diagram illustrating an example of a data frame of a standard format used in a CAN.

FIG. 1 is a diagram illustrating an example of a standard format of a data frame used in the CAN. This data format is described in the following standards document. ISO 11898-1:2003 Road vehicles—Controller area network (CAN)—Part1: Data link layer and physical signalling The data frame in FIG. 1 includes SOF, ID field, RTR, IDE, 1.0, DLC, data field, CRC delimiter, Ack, Ack delimiter, and EOF. A number in each box expresses a bit number. An item in a box whose upper part is open is an item that always takes "0", and an item in a box whose lower part is open is an item that always takes "1". An item in a box whose upper and lower parts are not open is an item that can take both "0" and "1".

In the present exemplary embodiment, mainly ID field F1 and data field F2 are focused. An ID stored in ID field F1 (hereinafter, also appropriately referred to as a CANID) is identification information that expresses a kind and priority of a message. In the present specification, a data frame in a transmittable state is called a message. A message in the CAN is a message concerning a specific notification matter of a specific processing object in the vehicle. The processing object contains a specific monitoring object and a specific control object. For example, messages concerning a specific processing object in the vehicle include a message containing speed information, a message for instructing opening and closing of the door. A plurality of notification matters are set for the same processing object, depending on the case. For example, for one meter, a plurality of notification matters can be set, such as a notification matter for notifying an engine rotation number, and a notification matter for notifying an engine water temperature.

A CANID is related to a specific notification matter of a specific processing object contained in a message to be transmitted. The ECU that receives a message determines, based on the CANID, contents of the specific notification matter contained in the message. Data field F2 can store data of maximum 64 bits.

As illustrated in FIG. 1, a data frame of the CAN does not contain a transmission destination ID and a reception destination ID. Therefore, a reception-side ECU cannot determine whether a message is from a correct communication partner. For example, a message containing an engine rotation number is transmitted from an engine ECU. When a message provided with a CANID that is the same as the CANID given to the message is transmitted from an unauthorized ECU, the reception-side ECU cannot determine whether the message is transmitted from an authorized engine ECU or from an unauthorized ECU. That is, even when an unauthorized ECU transmits a message containing unauthorized information by impersonating a transmission ECU, the reception-side ECU processes the unauthorized information as an authorized message, and a subsequent process (such as control of an auxiliary machine) is adversely affected. For example, when an unauthorized ECU transmits a message containing an engine rotation number by impersonating an engine ECU, control of a meter ECU that receives the message is adversely affected.

In this way, a CAN protocol may be susceptible to impersonation. Further, because the message is broadcasted to the CAN bus, the message is more likely to be stolen than the message that is unicast-transmitted.

Against these threats, in the present exemplary embodiment, a CAN message is authenticated by using a MAC. A MAC is generated by applying a predetermined MAC algorithm to data to be authenticated and to a common key. The common key is a secret key shared beforehand among ECUs connected to the CAN. A MAC generation algorithm includes a scheme using a hash function (HMAC), and a scheme using a block encryption algorithm (OMAC/CMAC, CBC-MAC, PMAC). The reception-side ECU calculates a MAC by applying a MAC algorithm used by a transmission-side ECU, to data to be authenticated contained in a message and to the common key of the reception-side ECU. When the calculated MAC and the received MAC coincide with each other, it is determined that the authentication is successful, and when the calculated MAC and the received MAC do not coincide with each other, it is determined that the authentication is unsuccessful.

Therefore, unless the common key is leaked out, a message from an unauthorized ECU or from a malicious transmission source will not be authenticated. A retransmission attack from an unauthorized ECU and the like that have received an authorized message and a MAC can be coped with by containing a counter value and the like in data to be authenticated. In the present exemplary embodiment, a data length of a MAC generated by the transmission-side ECU is 64 bits or smaller. When the MAC having a data length greater than 64 bits is calculated, arbitrary 64 bits or smaller bits are extracted to be used.

Hereinafter, in the present specification, a message that contains information concerning a specific notification matter of a specific processing object (hereinafter, appropriately referred to as ordinary data) and that does not contain a MAC in a data field will be called a main message. The main message is a message transmitted for performing an ordinary process. Ordinary data corresponds to a control value concerning a specific function of a specific processing object and the like. A message not containing ordinary data and containing a MAC in a data field is called a MAC message. A message containing both ordinary data and a MAC in a data field is called a MAC-attached main message. A main message, a MAC message, and a MAC-attached main message are ordinary messages. Other than the ordinary message, there is a message for notifying that a message containing a certain CANID is an unauthorized message. Hereinafter, this message will be called an unauthorized-access notification message. A message containing at least any one of a MAC message, a MAC-attached main message, and an unauthorized-access notification message is called an abnormality notification message. The abnormality notification message is a message for notifying another ECU of detection of an abnormality when the abnormality due to "impersonation" as described above is detected. As described in detail later, in the following exemplary embodiment, because the reception-side ECU can determine occurrence of an abnormality (unauthorized access by impersonation) at a time point of reception of a MAC, both a MAC message and a MAC-attached main message are also substantially included in an abnormality notification message.

Because of a characteristic of a CAN, basically, an ECU that transmits a message of certain identification (ID) is uniquely determined. Based on utilization of a characteristic of broadcast of the CAN, the ECU can detect an unauthorized message transmission, by monitoring whether a message of the ID to be transmitted by the self is transmitted by another ECU. Hereinafter, a method for ensuring security without constantly transmitting a MAC will be investigated by utilizing this detection method.

Figure 2:
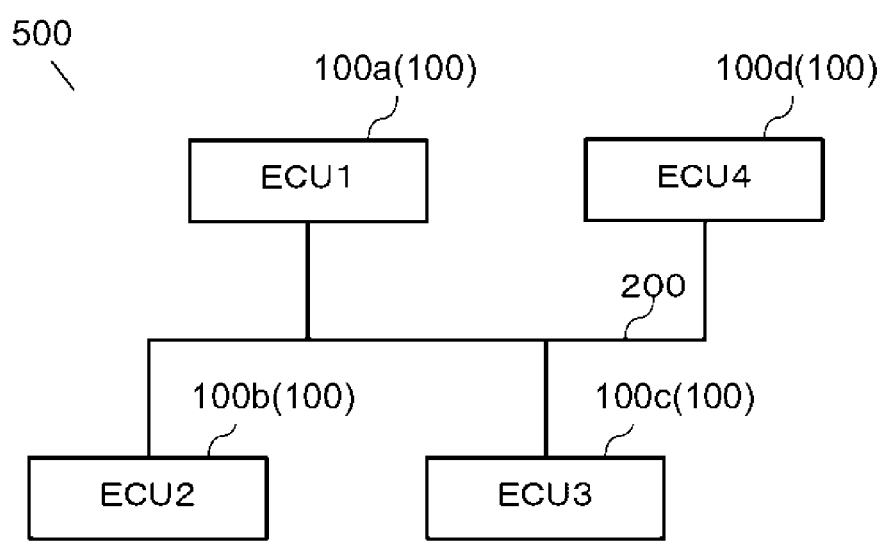
FIG. 2 is a diagram illustrating an example of a configuration of a CAN system according to an exemplary embodiment of the present invention.

FIG. 2 is a diagram illustrating an example of a configuration of CAN system 500 according to an exemplary embodiment of the present invention. In CAN system 500, a plurality of ECUs 100 (ECU1 (100a), ECU2 (100b), ECU3 (100c), and ECU4 (100d) in FIG. 2) are connected to CAN bus 200. A CAN employs an access control scheme called CSMA/CA (Carrier Sense Multiple Access with Collision Avoidance). ECU 100 that first starts transmission to CAN bus 200 obtains a transmission right. When a plurality of ECUs 100 have transmitted at the same time, communication arbitration (bus arbitration) is performed. In the CAN, ECU 100 having a smaller CANID has a priority.

Figure 3:
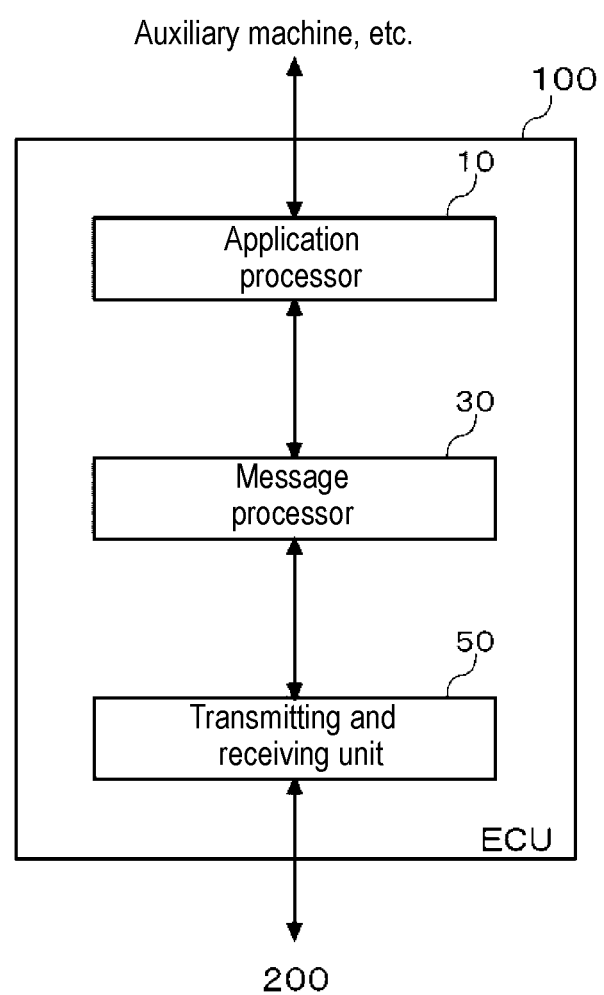
FIG. 3 is a diagram illustrating a configuration example of an electronic control unit (ECU) according to the exemplary embodiment of the present invention.

FIG. 3 is a diagram illustrating a configuration example of electronic control unit (ECU) 100 according to the exemplary embodiment of the present invention. ECU 100 has application processor 10, message processor 30, and transmitting and receiving unit 50. The configurations of these processors and unit can be realized by an arbitrary processor, a memory, and other LSI by hardware, and can be realized by programs loaded on memories by software. FIG. 3 illustrates function blocks realized by linkage of the hardware and software. Therefore, persons skilled in the art concerned can understand that the function blocks can be realized by only hardware, or by only software, or by combinations of hardware and software.

Application processor 10 is realized by a processor, a memory, and an application programs loaded in the memories, for example. Message processor 30 is realized by a processor, a memory, a message processing program loaded in the memories, and a CAN controller, for example. A configuration of installing all functions in the CAN controller is also possible. Transmitting and receiving unit 50 is realized by a transceiver, for example.

Application processor 10 is connected to processing objects of each ECU 100 (engine, steering, brake, or other various auxiliary machines, for example), and obtains status information or instruction information from these processing objects. Application processor 10 generates data to be broadcasted by a CAN, based on information obtained from the processing object, and delivers the data to message processor 30. Application processor 10 receives, from message processor 30, data contained in a main message or a MAC-attached main message received via CAN bus 200, and handles the processing object in accordance with the data.

Message processor 30 generates a message at a message transmission time, and analyzes the message at a message reception time. A concrete configuration of message processor 30 will be described later.

Transmitting and receiving unit 50 broadcasts the message generated by message processor 30 to CAN bus 200. Transmitting and receiving unit 50 receives, from CAN bus 200, a message generated by another ECU 100 and broadcasted to CAN bus 200. Transmitting and receiving unit 50 delivers the received message to message processor 30.

In the present exemplary embodiment, when authorized transmission-side ECU 100 has detected that a device other than authorized transmission-side ECU 100 transmits, to another ECU 100, a message to be transmitted by authorized transmission-side ECU 100, authorized transmission-side ECU 100 notifies reception-side ECU 100 of abnormality. Accordingly, unauthorized control is prevented. Regarding a function of a processing object specified by an ID contained in an unauthorized message after detection of the unauthorized message by authorized-transmission-side ECU 100, there are considered a scheme for continuing control and a scheme for shifting to fail-safe control. The scheme for continuing control will be described first.

Figure 4:
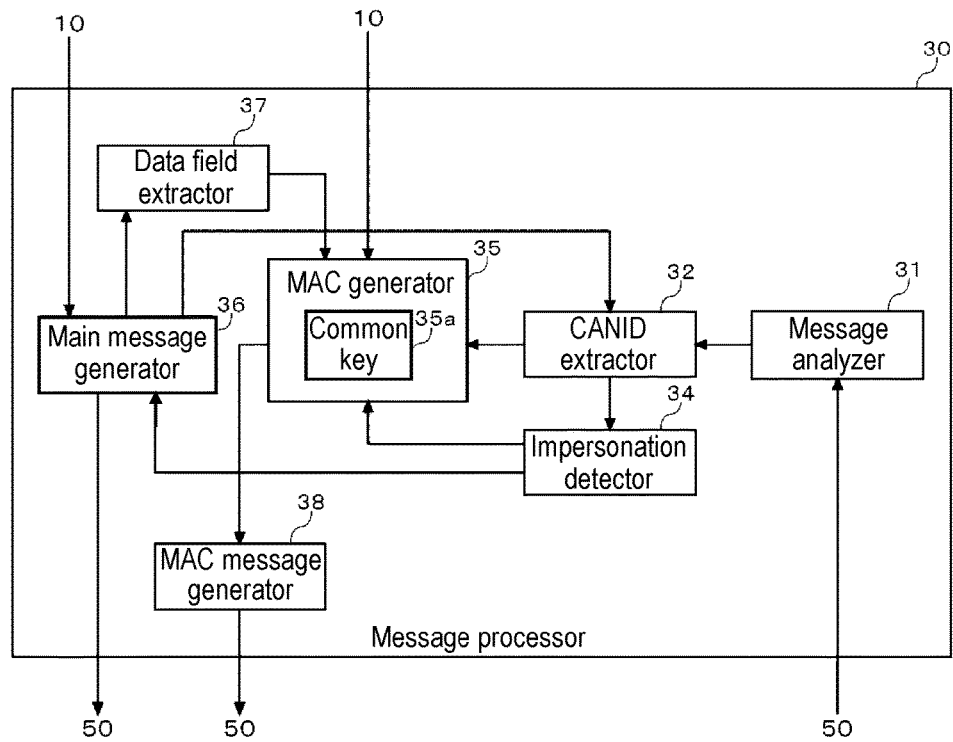
FIG. 4 is a block diagram illustrating functions necessary for impersonation detection and message transmission performed by a message processor when a MAC is transmitted by a separate message in a scheme for continuing control after abnormality detection.

FIG. 4 is a block diagram illustrating functions necessary for impersonation detection and message transmission performed by message processor 30 when a MAC is transmitted by a separate message in the scheme for continuing control after abnormality detection. In FIG. 4, functions concerning reception are omitted. Message processor 30 in FIG. 4 has message analyzer 31, CANID extractor 32, impersonation detector 34, MAC generator 35, main message generator 36, data field extractor 37, and MAC message generator 38.

Figure 5:
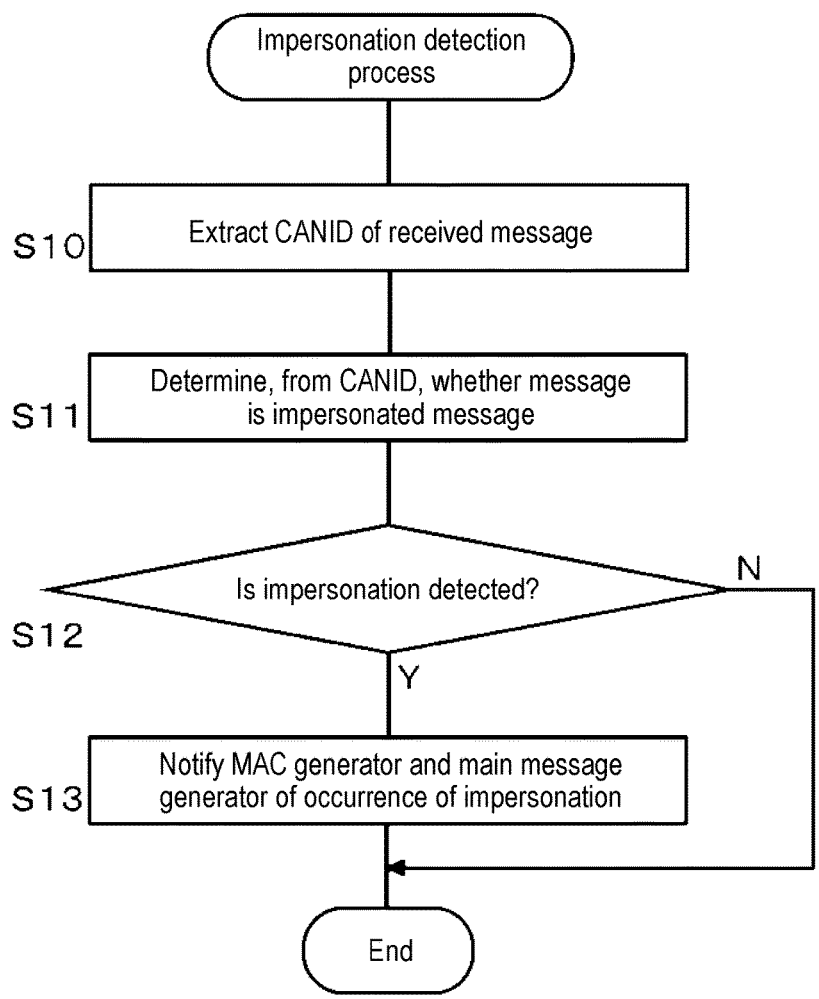
FIG. 5 is a flowchart illustrating an impersonation detection process performed by the message processor in FIG. 4.

FIG. 5 is a flowchart illustrating an impersonation detection process performed by message processor 30 in FIG. 4. Transmitting and receiving unit 50 receives a message from CAN bus 200, and delivers the message to message analyzer 31. CANID extractor 32 extracts a CANID from an ID field of a message received by message analyzer 31 (S10 in FIG. 5). CANID extractor 32 delivers an extracted CANID to impersonation detector 34.

Impersonation detector 34 compares a CANID delivered from CANID extractor 32 with a CANID to be contained in a message that self ECU 100 transmits, and detects impersonation (S11). In this case, it is general that there are a plurality of IDs that the self transmits, and it is assumed that the plurality of IDs (ID group) are listed (ID list) and stored in a memory of each ECU. Therefore, impersonation detector 34 compares all IDs in the ID list with a CANID.

When both CANIDs coincide with each other, impersonation detector 34 determines that the received message is an impersonated message. If impersonation is detected (Y in S12), impersonation detector 34 notifies MAC generator 35 and main message generator 36 of occurrence of impersonation (S13). If impersonation is not detected (N in S12), the process in step S13 is skipped.

Figure 6:
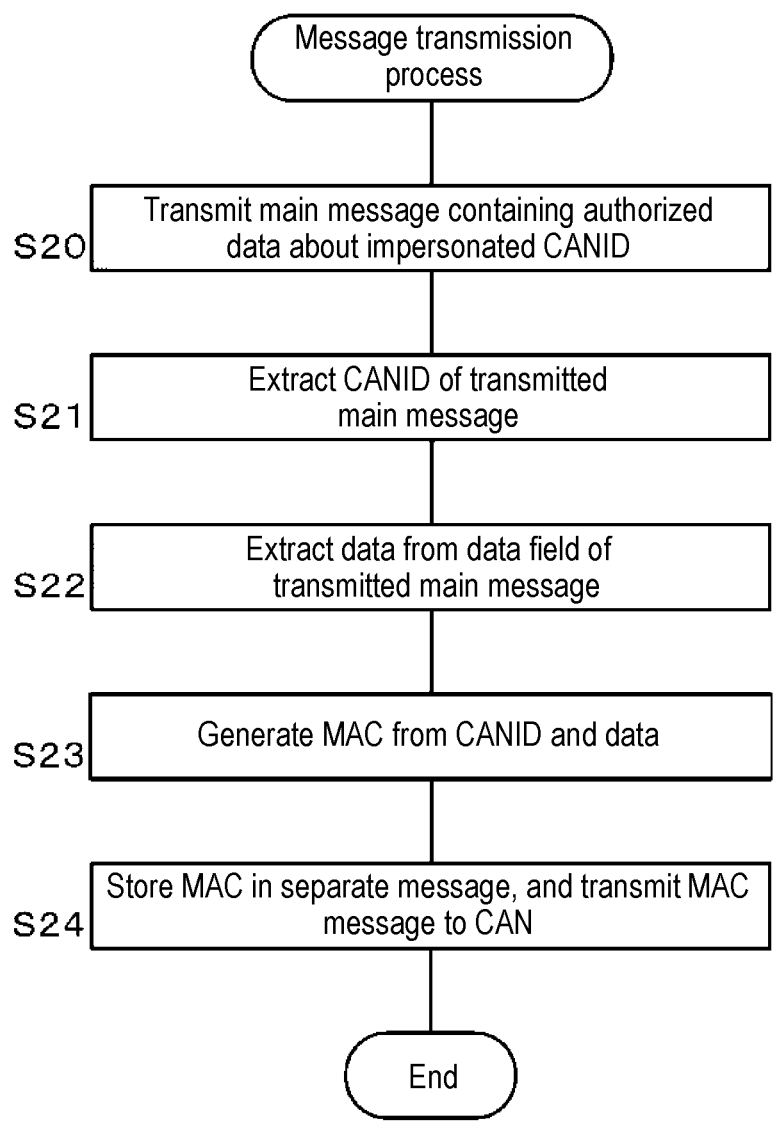
FIG. 6 is a flowchart illustrating a message transmission process after impersonation is detected by the message processor in FIG. 4.

FIG. 6 is a flowchart illustrating a message transmission process after impersonation is detected by message processor 30 in FIG. 4. Upon receiving notification of occurrence of impersonation from impersonation detector 34, main message generator 36 obtains, from application processor 10, authorized data concerning function of a processing object specified by an impersonated CANID. Main message generator 36 stores obtained data into the data field of a CAN message. Main message generator 36 also stores a CANID corresponding to the data, into an ID field. Main message generator 36 determines values of other items of the CAN message, and completes a main message. Main message generator 36 delivers the generated main message to transmitting and receiving unit 50, and transmitting and receiving unit 50 broadcasts the main message to CAN bus 200 (S20 in FIG. 6).

CANID extractor 32 extracts a CANID from an ID field of the transmitted main message (S21). CANID extractor 32 delivers an extracted CANID to MAC generator 35. Data field extractor 37 extracts data stored in a data field of the transmitted main message (S22). Data field extractor 37 delivers extracted data to MAC generator 35.

MAC generator 35 generates a MAC, based on the extracted CANID and data (S23). Specifically, MAC generator 35 applies a predetermined MAC algorithm to an authentication target containing at least the extracted CANID and data, using common key 35a of MAC generator 35. Accordingly, a MAC for the authentication target is generated. MAC generator 35 delivers the generated MAC to MAC message generator 38.

MAC message generator 38 stores a MAC obtained from MAC generator 35, into a data field of a CAN message. Further, MAC message generator 38 stores into an ID field a CANID indicating a message containing a MAC for the data. For example, there may be used a value obtained by subtracting a predetermined fixed value from a value of a CANID indicating a message containing the data itself. MAC message generator 38 determines values of other items of the CAN message, and completes a MAC message. MAC message generator 38 delivers the generated MAC message to transmitting and receiving unit 50, and transmitting and receiving unit 50 broadcasts the MAC message to CAN bus 200 (S24).

With reference to FIG. 6, the description has been given of an example of transmitting first a main message containing authorized data of a function of a processing object specified by an impersonated CANID and transmitting later a MAC message containing a MAC for at least the authorized data. In this respect, the MAC message may be transmitted first and the main message may be transmitted later.

Figure 7:
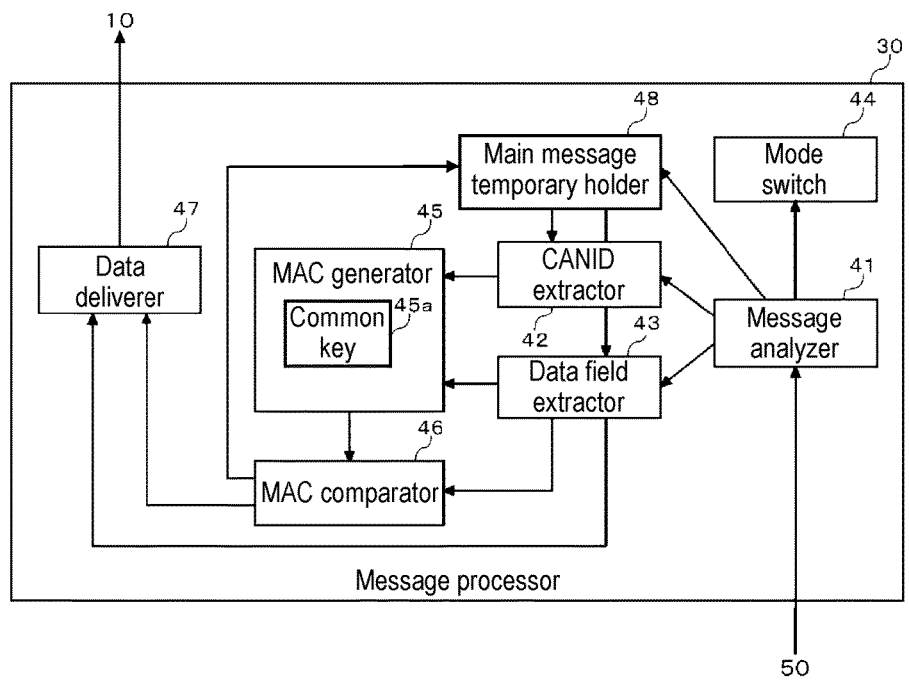
FIG. 7 is a block diagram illustrating functions necessary for message reception performed by the message processor when a main message is received first and a MAC message is received later in the scheme for continuing control after abnormality detection.

FIG. 7 is a block diagram illustrating functions necessary for message reception performed by message processor 30 when receiving first a main message and receiving later a MAC message in the scheme for continuing control after abnormality detection. In FIG. 7, functions concerning impersonation detection and message transmission are omitted. Message processor 30 in FIG. 7 has message analyzer 41, CANID extractor 42, data field extractor 43, mode switch 44, MAC generator 45, MAC comparator 46, data deliverer 47, and main message temporary holder 48.

Figure 8:
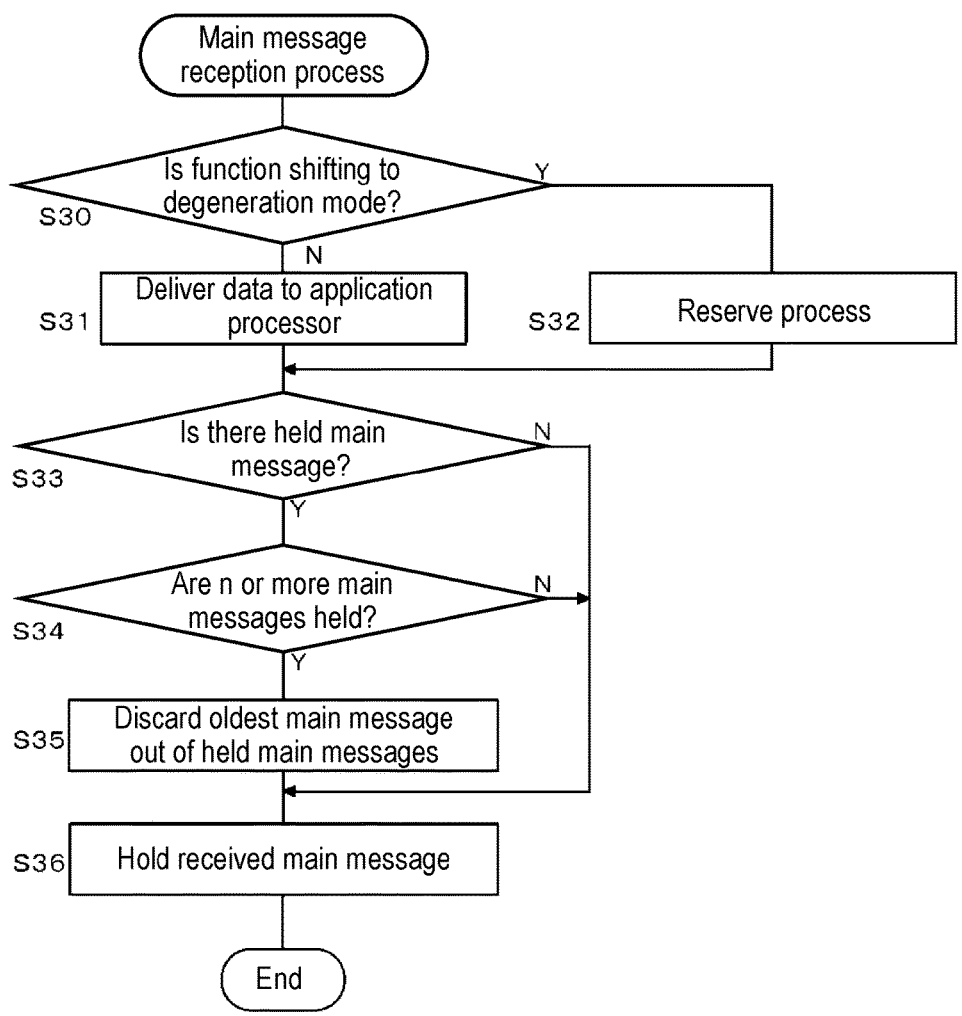
FIG. 8 is a flowchart illustrating a main message reception process performed by the message processor in FIG. 7.

FIG. 8 is a flowchart illustrating a main message reception process performed by message processor 30 in FIG. 7. Transmitting and receiving unit 50 receives a main message from CAN bus 200, and delivers the received main message to message analyzer 41. Upon receiving a main message, message analyzer 41 determines whether a function of a processing object specified by a CANID contained in the main message is shifting to a degeneration mode (S30 in FIG. 8).

The degeneration mode in the scheme for continuing control after abnormality detection is a mode of using data concerning a specific function of a specific processing object contained in a main message for the process concerning the function under a condition that MAC verification is successful. Therefore, when MAC verification is unsuccessful, data concerning the function is discarded without being used. In an ordinary mode, the data contained in a main message is used for the process concerning the function without performing MAC verification.

In step S30, if a function of a processing object is in the ordinary mode instead of shifting to the degeneration mode (N in S30), data field extractor 43 extracts data stored in a data field of a main message, and delivers the extracted data to data deliverer 47, for the main message received by message analyzer 41. Data deliverer 47 delivers data obtained from data field extractor 43 to application processor 10 (S31). Application processor 10 processes a processing object in accordance with obtained data.

In step S30, if a function of a processing object is shifting to the degeneration mode (Y in S30), the process is reserved, without message analyzer 41 delivering a received main message to data field extractor 43 (S32).

Message analyzer 41 determines whether a main message is held in main message temporary holder 48 (S33). If a main message is held (Y in S33), message analyzer 41 determines whether the number of main messages held in main message temporary holder 48 is n or more (S34). In this case, n is a parameter that prescribes an upper limit number of main messages held in main message temporary holder 48. For example, n=3 is set.

If n or more main messages are held (Y in S34), message analyzer 41 discards an oldest main message out of a plurality of main messages held in main message temporary holder 48 (S35). Message analyzer 41 stores a received new main message into main message temporary holder 48 (S36). That is, main message temporary holder 48 is managed in a FIFO (FIRST-IN FIRST-OUT) manner. The generation process of a MAC for data contained in a main message stored in main message temporary holder 48 is reserved until there is an instruction from message analyzer 41.

In step S34, if the number of main messages held in main message temporary holder 48 is less than n (N in S34), step S35 is skipped, and message analyzer 41 stores a received new main message into main message temporary holder 48 (S36).

In step S33, if a main message is not held in main message temporary holder 48 (N in S33), message analyzer 41 stores a received new main message into main message temporary holder 48 (S36).

Figure 9:
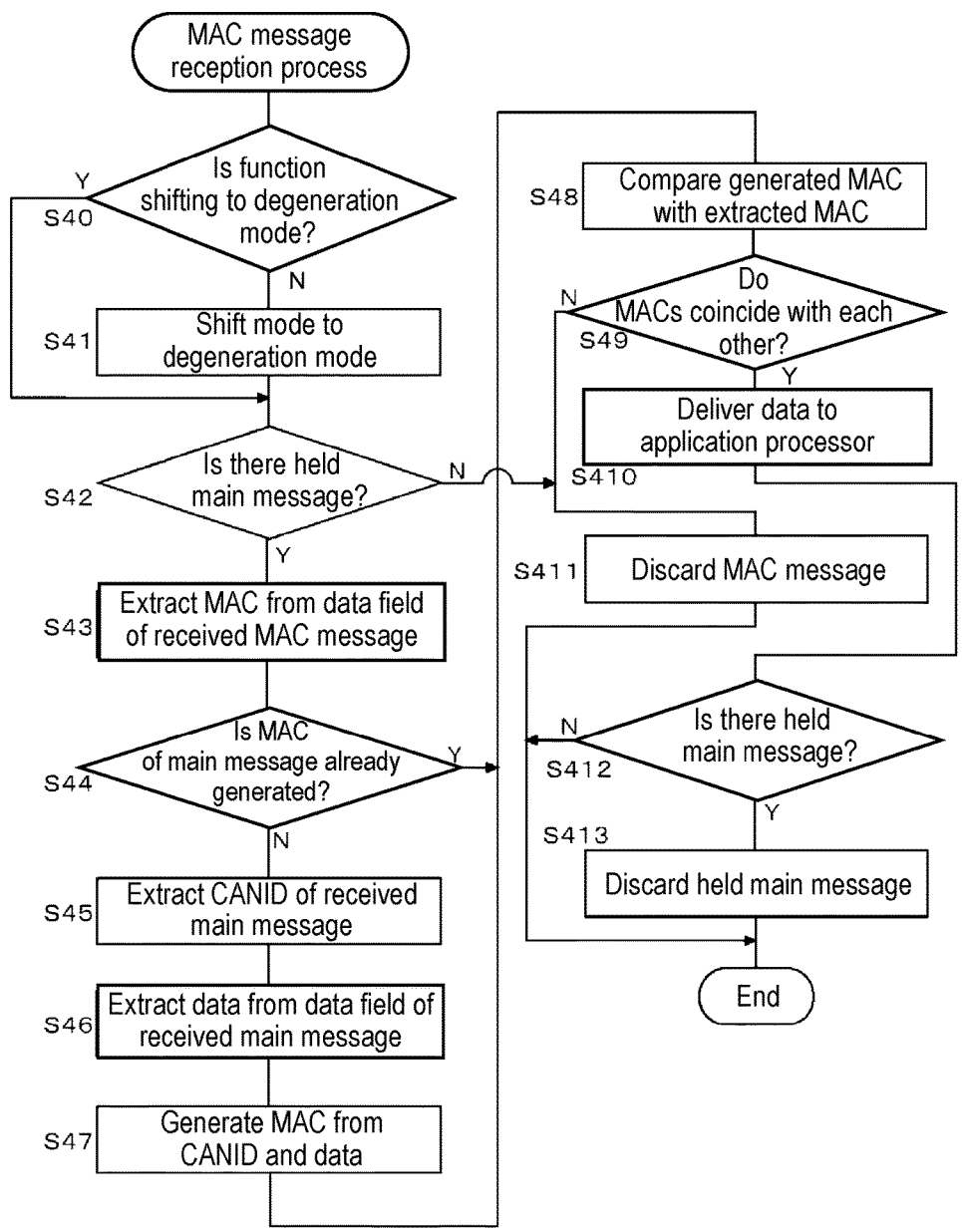
FIG. 9 is a flowchart illustrating a MAC message reception process performed by the message processor in FIG. 7.

FIG. 9 is a flowchart illustrating a MAC message reception process by message processor 30 in FIG. 7. Transmitting and receiving unit 50 receives a MAC message from CAN bus 200, and delivers the received MAC message to message analyzer 41. Upon receiving a MAC message, message analyzer 41 determines whether a function of a processing object specified by a CANID contained in the main message is shifting to the degeneration mode (S40 in FIG. 9). If a function of a processing object is not shifting to the degeneration mode (N in S40), mode switch 44 switches the ordinary mode to the degeneration mode (S41). If a function of a processing object is shifting to the degeneration mode (Y in S40), the degeneration mode is continued. In this way, in the scheme for continuing control after abnormality detection, a function of a processing object shifts to the degeneration mode in a reception timing of a MAC by reception-side ECU 100.

Message analyzer 41 determines whether a main message is held in main message temporary holder 48 (S42). If a main message is held (Y in S42), message analyzer 41 delivers the received MAC message to data field extractor 43, and data field extractor 43 extracts a MAC from the data field of the obtained MAC message (S43). Data field extractor 43 delivers the extracted MAC to MAC comparator 46.

If a MAC of a main message held in main message temporary holder 48 is not yet generated (N in S44), CANID extractor 42 extracts a CANID from an ID field of a main message received by message analyzer 41 and held in main message temporary holder 48 (S45). CANID extractor 42 delivers an extracted CANID to MAC generator 45. Data field extractor 43 extracts data stored in a data field of a main message received by message analyzer 41 and held in main message temporary holder 48 (S46). Data field extractor 43 delivers the extracted data to MAC generator 45 and data deliverer 47.

MAC generator 45 generates a MAC, based on the extracted CANID and data (S47). A generation method is the same as the generation method in transmission-side MAC generator 35. Reception-side MAC generator 45 holds common key 45a which is the same as common key 35a held by transmission-side MAC generator 35. MAC generator 45 delivers the generated MAC to MAC comparator 46.

MAC comparator 46 compares a MAC generated by MAC generator 45 with a MAC extracted by data field extractor 43 (S48). If both MACs coincide with each other (Y in S49), MAC comparator 46 determines that MAC verification is successful, and notifies data deliverer 47 of the successful verification. Data field extractor 43 extracts data from a data field of a MAC-verification-successful main message, and delivers the extracted data to data deliverer 47. Data deliverer 47 delivers data delivered from data field extractor 43 to application processor 10 (S410). Application processor 10 handles a processing object in accordance with obtained data.

Message analyzer 41 determines whether a main message is held in main message temporary holder 48 (S412). If the message is held (Y in S412), message analyzer 41 discards the message held in main message temporary holder 48 (S413). If a main message is not held in main message temporary holder 48 (N in S412), the process in step S413 is skipped.

In step S49, if the MACs do not coincide with each other (N in S49), MAC comparator 46 determines that MAC verification is unsuccessful, and notifies data deliverer 47 of the unsuccessful verification. Data deliverer 47 does not deliver data delivered from data field extractor 43 to application processor 10. Message analyzer 41 discards the received MAC message (S411).

In step S44, if a MAC of a main message held in main message temporary holder 48 is already generated (Y in S44), the processes in step S45 to S47 are skipped.

In step S42, if a main message is not held in main message temporary holder 48 (N in S42), message analyzer 41 discards the received MAC message (S411).

At the reception time of a MAC message, when a plurality of main messages are held in main message temporary holder 48, MACs are generated sequentially starting from a new main message, and the MACs are compared with the MAC contained in the received MAC message. At a detection time point of a main message corresponding to the received MAC message, a process corresponding to data contained in the main message is executed. At the same time, remaining main messages held in main message temporary holder 48 are discarded.

Figure 10:
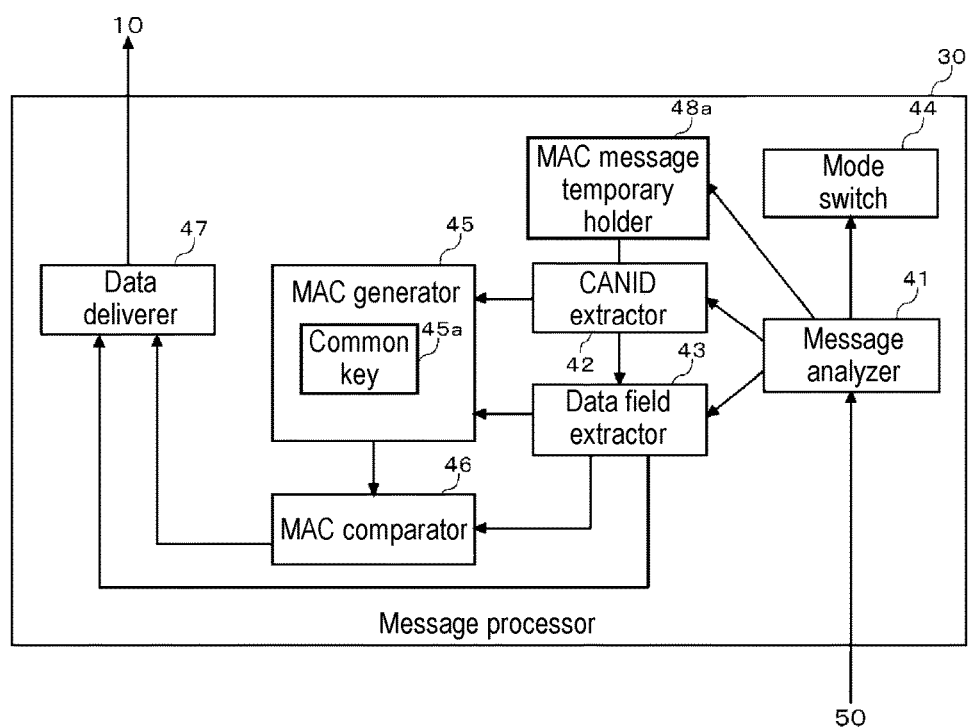
FIG. 10 is a block diagram illustrating functions necessary for message reception performed by the message processor when a MAC message is received first and a main message is received later in the scheme for continuing control after abnormality detection.

FIG. 10 is a block diagram illustrating functions necessary for message reception performed by message processor 30 when a MAC message is received first and a main message is received later in the scheme for continuing control after abnormality detection. In FIG. 10, functions concerning impersonation detection and message transmission are omitted. Message processor 30 in FIG. 10 has a configuration that main message temporary holder 48 of message processor 30 in FIG. 7 is replaced by MAC message temporary holder 48a.

Figure 11:
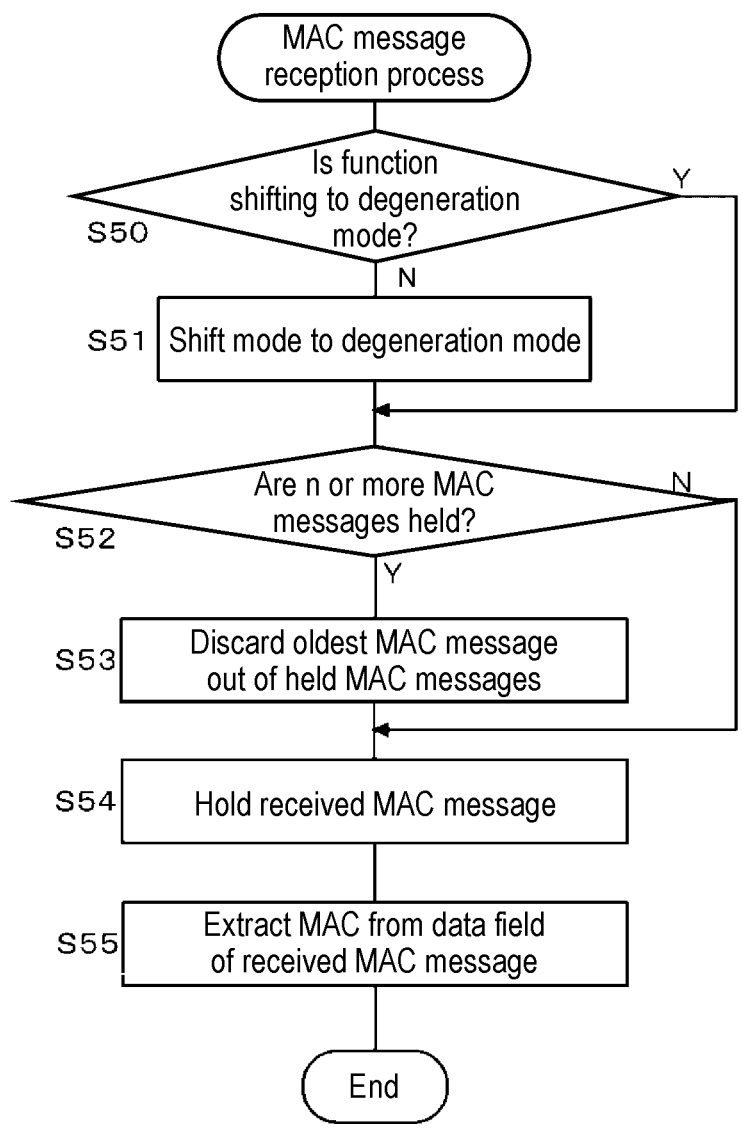
FIG. 11 is a flowchart illustrating a MAC message reception process performed by the message processor in FIG. 10.

FIG. 11 is a flowchart illustrating a MAC message reception process by message processor 30 in FIG. 10. Transmitting and receiving unit 50 receives a MAC message from CAN bus 200, and delivers the received MAC message to message analyzer 41. Upon receiving the MAC message, message analyzer 41 determines whether a function of a processing object specified by a CANID contained in the MAC message is shifting to the degeneration mode (S50 in FIG. 11). If a function of a processing object is not shifting to the degeneration mode (N in S50), mode switch 44 switches the ordinary mode to the degeneration mode (S51). If a function of a processing object is shifting to the degeneration mode (Y in S50), the degeneration mode is continued.

Message analyzer 41 determines whether the number of MAC messages held in MAC message temporary holder 48a is n or more (S52). In this case, n is a parameter that prescribes an upper limit number of MAC messages held in MAC message temporary holder 48a. For example, n=3 is set.

If the number of MAC messages held in MAC message temporary holder 48a is n or more (Y in S52), message analyzer 41 discards an oldest main message out of a plurality of MAC messages held in MAC message temporary holder 48a (S53). Message analyzer 41 stores a received new MAC message into MAC message temporary holder 48a (S54). That is, MAC message temporary holder 48a is managed in a FIFO (FIRST-IN FIRST-OUT) manner. In step S52, if the number of MAC messages held in MAC message temporary holder 48a is less than n (N in S52), step S53 is skipped, and message analyzer 41 stores a received new MAC message into MAC message temporary holder 48a (S54).

When a main message is received, data field extractor 43 extracts a MAC stored in a data field of a first-received MAC message, and delivers the extracted MAC to MAC comparator 46 (S55).

Figure 12:
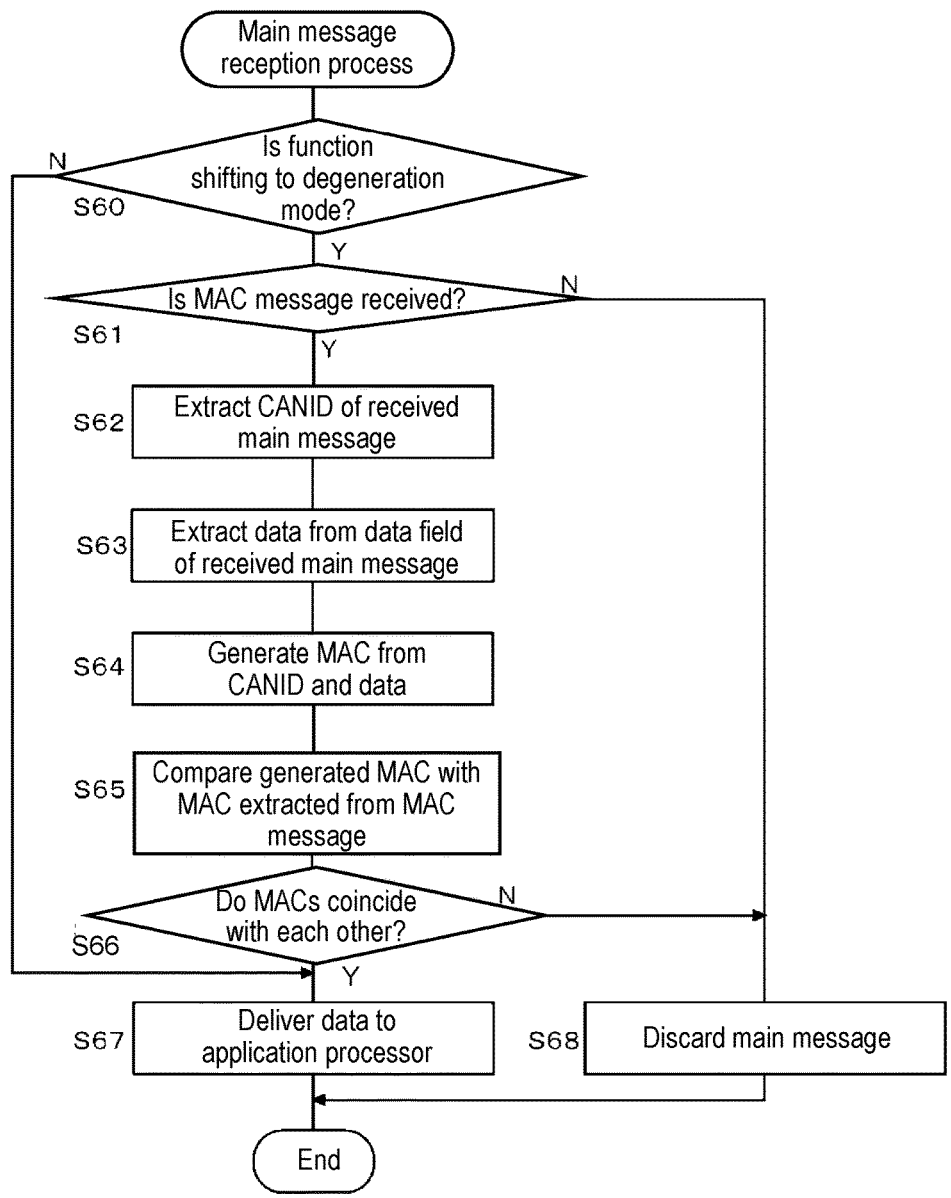
FIG. 12 is a flowchart illustrating a main message reception process performed by the message processor in FIG. 10.

FIG. 12 is a flowchart illustrating a main message reception process by message processor 30 in FIG. 10. Transmitting and receiving unit 50 receives a main message from CAN bus 200, and delivers the received main message to message analyzer 41. Upon receiving the main message, message analyzer 41 determines whether a function of a processing object specified by a CANID contained in the main message is shifting to the degeneration mode (S60 in FIG. 12).

If a function of a processing object is shifting to the degeneration mode (Y in S60) and also the MAC message has been received (Y in S61), CANID extractor 42 extracts a CANID from the ID field of a main message received by message analyzer 41 (S62). CANID extractor 42 delivers an extracted CANID to MAC generator 45. Data field extractor 43 extracts data stored in a data field of a main message received by message analyzer 41 (S63). Data field extractor 43 delivers the extracted data to MAC generator 45 and data deliverer 47.

MAC generator 45 generates a MAC, based on the extracted CANID and data (S64). MAC generator 45 delivers the generated MAC to MAC comparator 46. MAC comparator 46 compares a MAC generated by MAC generator 45 with a MAC extracted by data field extractor 43 from a data field of a MAC message (S65). If both MACs coincide with each other (Y in S66), MAC comparator 46 determines that MAC verification is successful, and notifies data deliverer 47 of the successful verification. Upon receiving the notification, data deliverer 47 delivers data delivered from data field extractor 43 and reserved, to application processor 10 (S67). Application processor 10 processes a processing object in accordance with obtained data.

In step S66, if the MACs do not coincide with each other (N in S66), MAC comparator 46 determines that MAC verification is unsuccessful, and notifies data deliverer 47 of the unsuccessful verification. Data deliverer 47 does not deliver data delivered from data field extractor 43 to application processor 10. In step S61, if a MAC message is not yet received (N in S61), message analyzer 41 discards a received main message (S68). In step S60, if a function of a processing object is not shifting to the degeneration mode (N in S60), step S61 to step S66 are skipped, and data extracted from a received main message is delivered to application processor 10 (S67). Application processor 10 handles a processing object in accordance with obtained data.

At the reception time of a main message, when a plurality of MAC messages are held in MAC message temporary holder 48a, the MACs are sequentially compared with a MAC generated in accordance with data contained in a main message starting from a new MAC. At a time point of coincidence of the MACs, a process corresponding to data contained in the main message is executed. At the same time, remaining MAC messages held in MAC message temporary holder 48a are discarded.

The description has been given of the case of transmitting first a main message containing authorized data and transmitting later a MAC message for the main message, and the case of transmitting first a MAC message for a main message containing authorized data and transmitting later the main message. Although any one of both transmission methods may be employed, when the latter transmission method is employed, a timing of shifting to the degeneration mode becomes earlier. This is because reception-side ECU 100 shifts to the degeneration mode started by reception of a MAC message. Even when an unauthorized message is inserted into between the MAC message and the main message by the attacker, because a function of a processing object has shifted to the degeneration mode, unauthorized control by the unauthorized message can be prevented.

Figure 13:
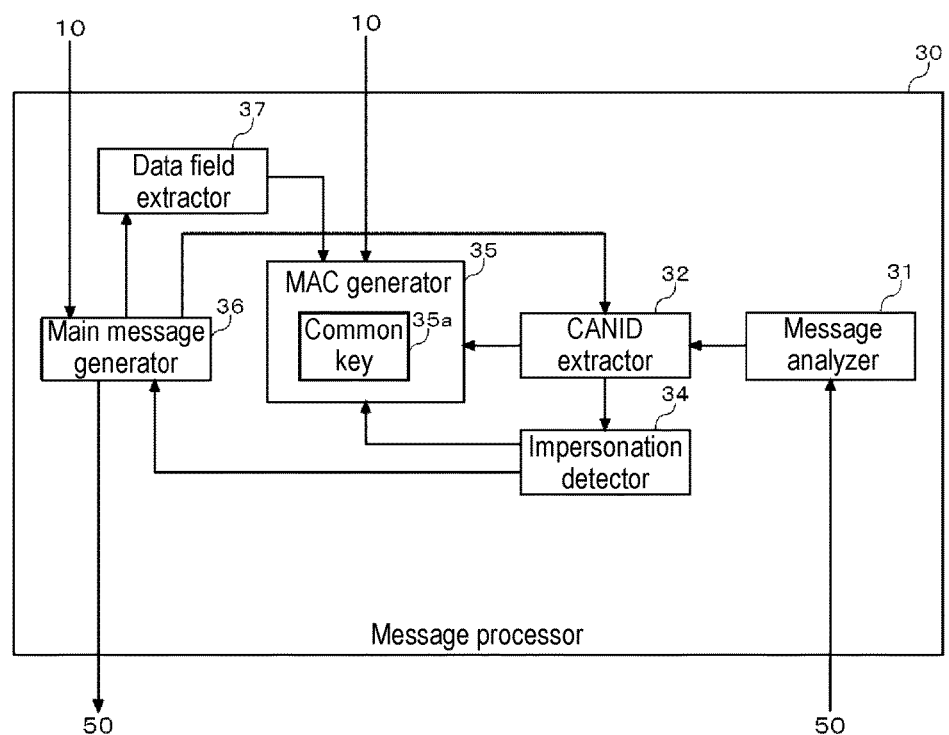
FIG. 13 is a block diagram illustrating functions necessary for impersonation detection and message transmission performed by the message processor when the MAC is transmitted by containing the MAC in a main message in the scheme for continuing control after abnormality detection.

FIG. 13 is a block diagram illustrating functions necessary for impersonation detection and message transmission by message processor 30 when the MAC is transmitted by containing the MAC in a main message in the scheme for continuing control after abnormality detection. In FIG. 13, functions concerning reception are omitted. Message processor 30 in FIG. 13 has a configuration in which MAC message generator 38 is omitted from message processor 30 in FIG. 4.

Figure 14:
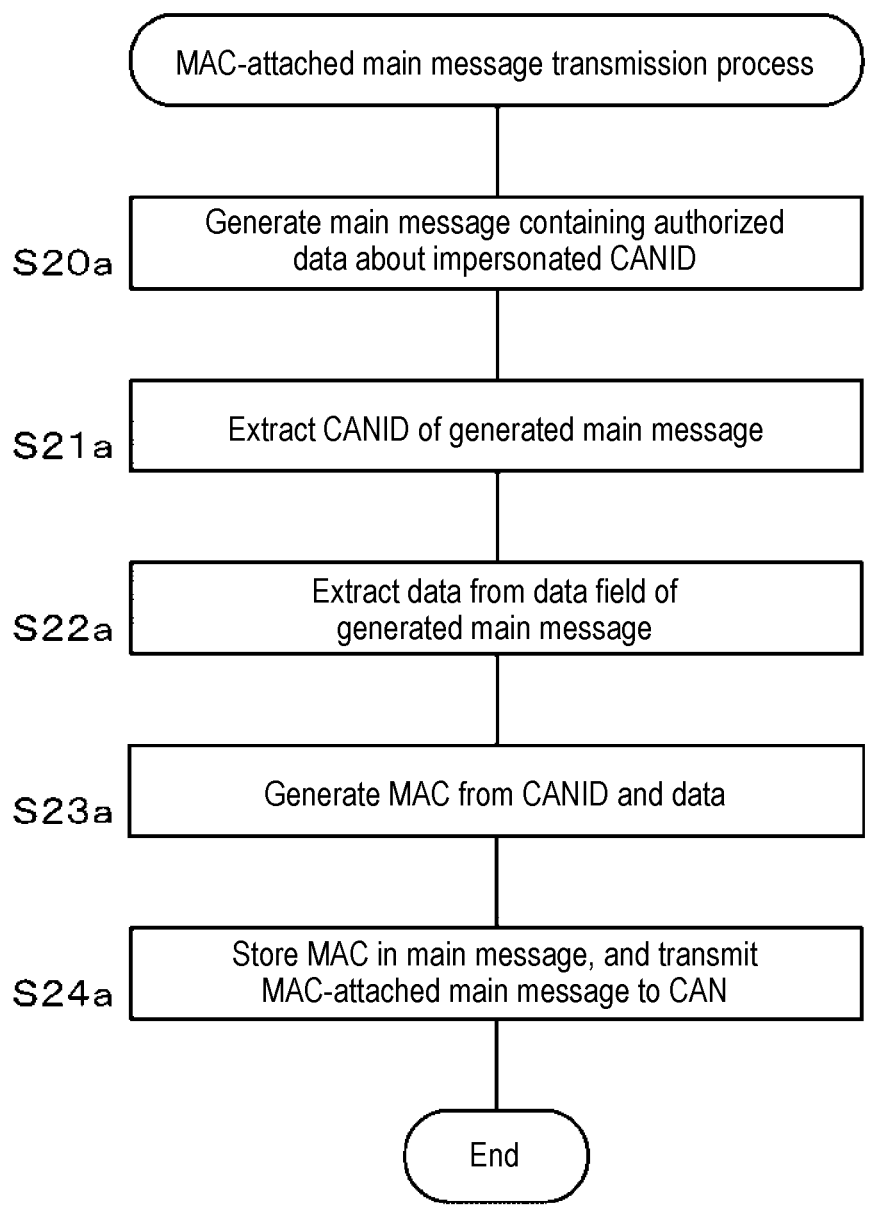
FIG. 14 is a flowchart illustrating a MAC-attached main message transmission process after impersonation is detected by the message processor in FIG. 13.

FIG. 14 is a flowchart illustrating a MAC-attached main message transmission process after impersonation is detected by message processor 30 in FIG. 13. Upon receiving notification of impersonation occurrence from impersonation detector 34, main message generator 36 obtains, from application processor 10, authorized data concerning a function of a processing object specified by an impersonated CANID. Main message generator 36 stores obtained data into a data field of a CAN message, and generates a main message (S20a).

CANID extractor 32 extracts a CANID from an ID field of a generated main message (S21a). CANID extractor 32 delivers an extracted CANID to MAC generator 35. Data field extractor 37 extracts data stored in a data field of a generated main message (S22a). Data field extractor 37 delivers extracted data to MAC generator 35.

MAC generator 35 generates a MAC, based on an extracted CANID and data (S23a). MAC generator 35 delivers the generated MAC to main message generator 36. Main message generator 36 additionally stores a MAC obtained from MAC generator 35 into a data field of the main message. Main message generator 36 delivers a MAC-attached main message having the additional MAC to transmitting and receiving unit 50, and transmitting and receiving unit 50 broadcasts the MAC-attached main message to CAN bus 200 (S24a).

Figure 15:
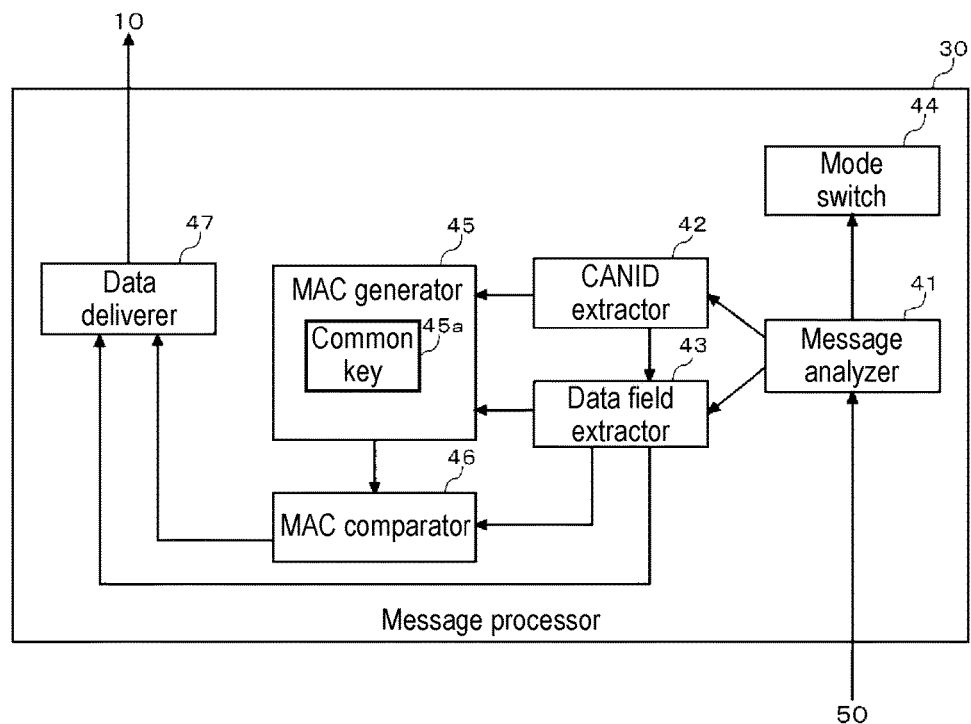
FIG. 15 is a block diagram illustrating functions necessary for message reception performed by the message processor when a MAC-attached main message is received in the scheme for continuing control after abnormality detection.

FIG. 15 is a block diagram illustrating functions necessary for message reception performed by message processor 30 when a MAC-attached main message is received in the scheme for continuing control after abnormality detection. In FIG. 15, functions concerning impersonation detection and message transmission are omitted. Message processor 30 in FIG. 15 has a configuration in which main message temporary holder 48 of message processor 30 in FIG. 7 is omitted. This configuration is also a configuration in which MAC message temporary holder 48a of message processor 30 in FIG. 10 is omitted.

Figure 16:
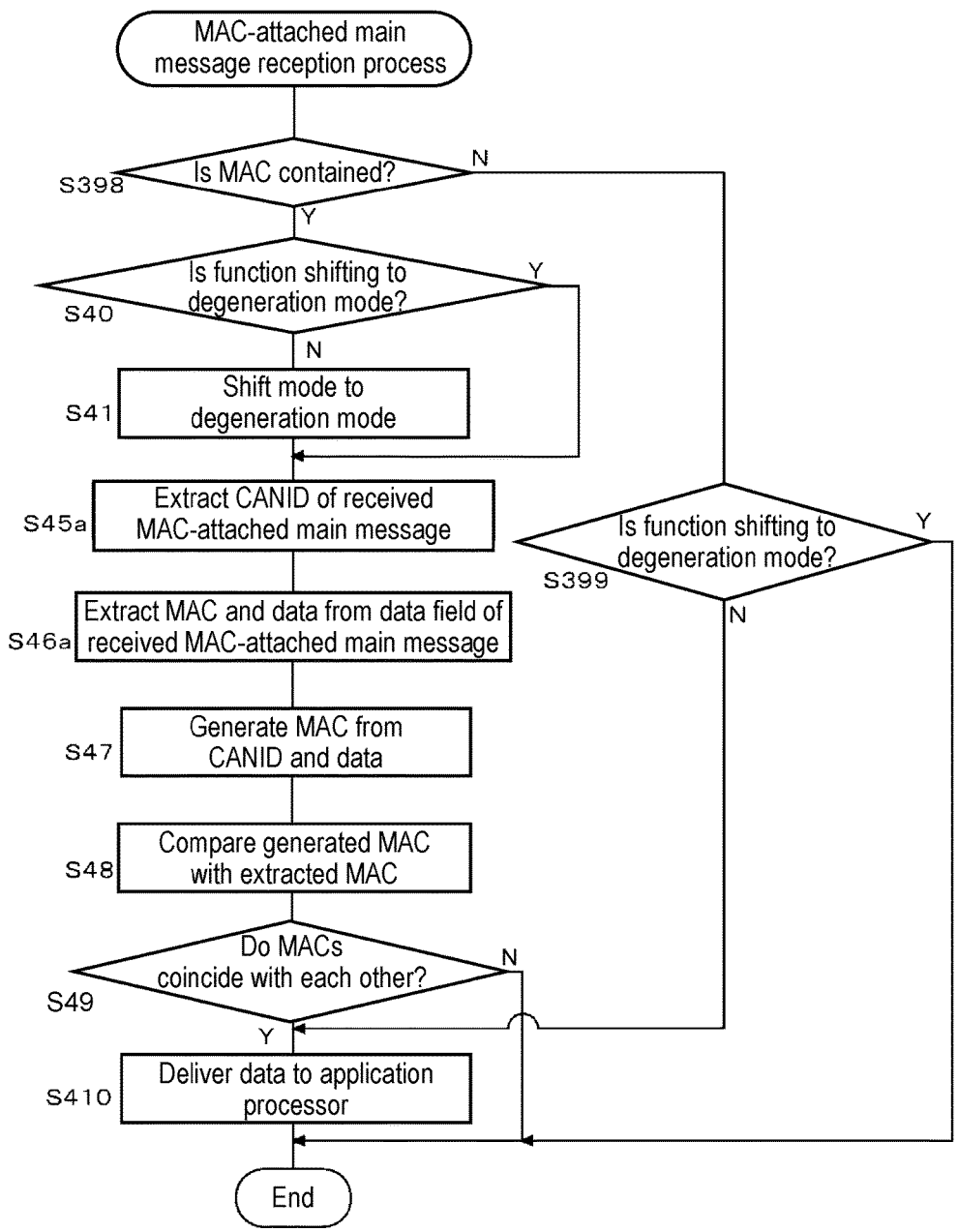
FIG. 16 is a flowchart illustrating a MAC-attached main message reception process by the message processor in FIG. 15.

FIG. 16 is a flowchart illustrating a MAC-attached main message reception process by message processor 30 in FIG. 15. Transmitting and receiving unit 50 receives a message from CAN bus 200, and delivers the received message to message analyzer 41. Message analyzer 41 determines whether a MAC is contained in the message obtained from transmitting and receiving unit 50 (S398 in FIG. 16). Whether a MAC is contained can be determined by referring to a flag that expresses whether a MAC is contained in a data length code (DLC), a CANID, or a data field.

If a MAC is contained (Y in S398), message analyzer 41 determines whether a function of a processing object specified by a CANID contained in a received MAC-attached main message is shifting to the degeneration mode (S40). If a function of a processing object is not shifting to the degeneration mode (N in S40), mode switch 44 switches the ordinary mode to the degeneration mode (S41). If a function of a processing object is shifting to the degeneration mode (Y in S40), the degeneration mode is continued.

CANID extractor 42 extracts a CANID from an ID field of a MAC-attached main message received by message analyzer 41 (S45a). CANID extractor 42 delivers an extracted CANID to MAC generator 45. Data field extractor 43 extracts a MAC and data from a data field of a MAC-attached main message received by message analyzer 41 (S46a). Data field extractor 43 delivers an extracted MAC to MAC comparator 46, and delivers extracted data to MAC generator 45 and data deliverer 47.

MAC generator 45 generates a MAC, based on the extracted CANID and data (S47). MAC comparator 46 compares a MAC generated by MAC generator 45 with a MAC extracted by data field extractor 43 (S48). If both MACs coincide with each other (Y in S49), MAC comparator 46 determines that MAC verification is successful, and notifies data deliverer 47 of the successful verification. Data deliverer 47 delivers data delivered from data field extractor 43 to application processor 10 (S410). Application processor 10 processes a processing object in accordance with obtained data.

In step S49, if the MACs do not coincide with each other (N in S49), MAC comparator 46 determines that MAC verification is unsuccessful, and notifies data deliverer 47 of the unsuccessful verification. Data deliverer 47 does not deliver data delivered from data field extractor 43 to application processor 10.

In step S398, if a MAC is not contained (Y in S398), message analyzer 41 determines whether a function of a processing object specified by a CANID contained in the received message is shifting to the degeneration mode (S399). If a function of a processing object is not shifting to the degeneration mode but in the ordinary mode (N in S399), data field extractor 43 extracts the data stored in a data field of a message received by the message analyzer 41, and delivers the extracted data to data deliverer 47. Data deliverer 47 delivers data obtained from data field extractor 43 to application processor 10 (S410). Application processor 10 processes a processing object in accordance with obtained data. In step S399, if a function of a processing object is shifting to the degeneration mode (Y in S399), data contained in the message received by message analyzer 41 is not delivered to application processor 10. The received message is discarded or is temporarily held in a message temporary holder not illustrated.

The above-described scheme for transmitting a MAC by containing the MAC in a main message is effective when the quantity of ordinary data to be transmitted is small. The scheme for transmitting a MAC by containing the MAC in a main message has basically an effect of decreasing a number of messages, as compared with the scheme for transmitting a MAC by a separate message. However, when the amount of ordinary data is large, it becomes difficult to make ordinary data and a MAC coexist in the 64-bit data field. In this case, because at least one of the ordinary data and the MAC needs to be divided into a plurality of pieces, a number of messages increases. Further, the scheme for transmitting a MAC by a separate message usually facilitates simplification of the process of message processor 30. Therefore, the scheme for transmitting a MAC by containing the MAC in a main message is not necessarily more advantageous than the scheme for transmitting a MAC by a separate message. Accordingly, both schemes are preferably set according to an application by considering the amount of ordinary data and the like.

Next, regarding a function of a processing object specified by the ID contained in the unauthorized message after detection of the unauthorized message by authorized-transmission-side ECU 100, a description will be given of the scheme for shifting to fail-safe control. In this scheme, authorized transmission-side ECU 100 that detects an unauthorized message notifies an unauthorized-access notification message. Upon receiving an unauthorized-access notification message, reception-side ECU 100 shifts to a predetermined degeneration mode, and performs fail-safe control.

As described above, the degeneration mode in the scheme for continuing control after abnormality detection means a mode of using data concerning a specific function contained in a main message, for the process of the function, under a condition that MAC verification is successful.

On the other hand, the degeneration mode in the scheme for shifting to fail-safe control after abnormality detection means a mode of performing prescribed fail-safe control without trusting the value of the data concerning a specific function contained in a main message of a CANID notified by an unauthorized-access notification message. Fail-safe control is control performed in accordance with a default value prescribed in advance by considering safety, in order to safely process a specific function of a specific processing object.

When an unauthorized access has occurred in a message relevant to an important function of an important processing object, the entire processing object or the entire vehicle may be shifted to fail-safe control instead of shifting only the function to fail-safe control. For example, control values concerning all processing objects in the vehicle may be set to prescribed default values by considering safety in advance so that the vehicle can be stopped safely.

Figure 17:
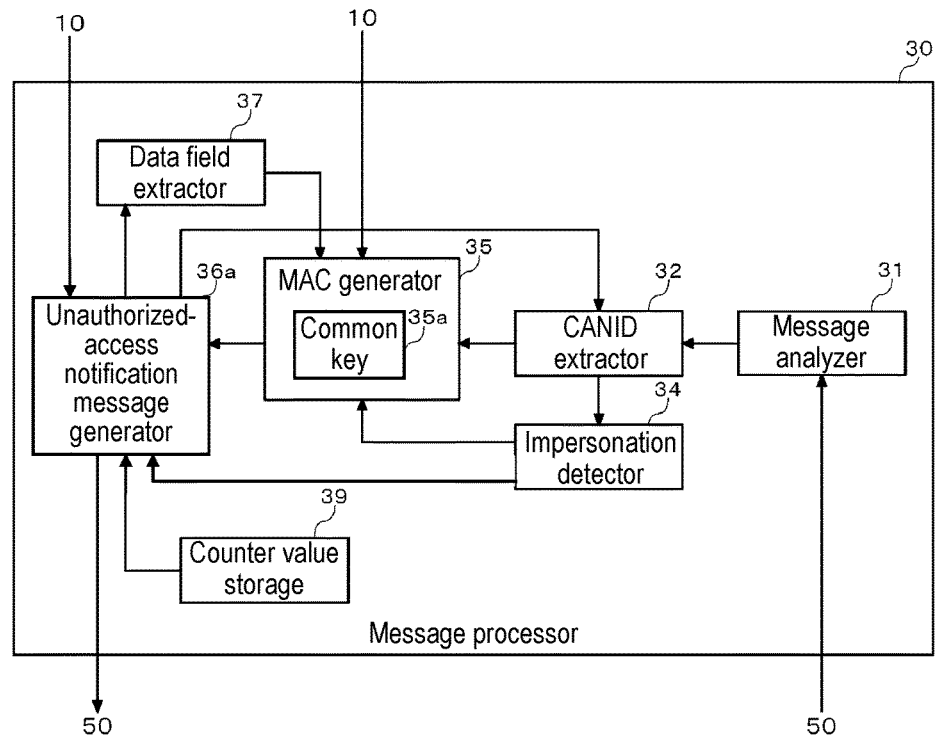
FIG. 17 is a block diagram illustrating functions necessary for impersonation detection and unauthorized-access notification message transmission performed by the message processor in the scheme for shifting to fail-safe control after abnormality detection.

FIG. 17 is a block diagram illustrating functions necessary for message processor 30 to perform impersonation detection and unauthorized-access notification message transmission in the scheme for shifting to fail-safe control after abnormality detection. In FIG. 17, functions concerning reception are omitted. Message processor 30 in FIG. 17 has message analyzer 31, CANID extractor 32, impersonation detector 34, MAC generator 35, unauthorized-access notification message generator 36a, data field extractor 37, and counter value storage 39.

Figure 18:
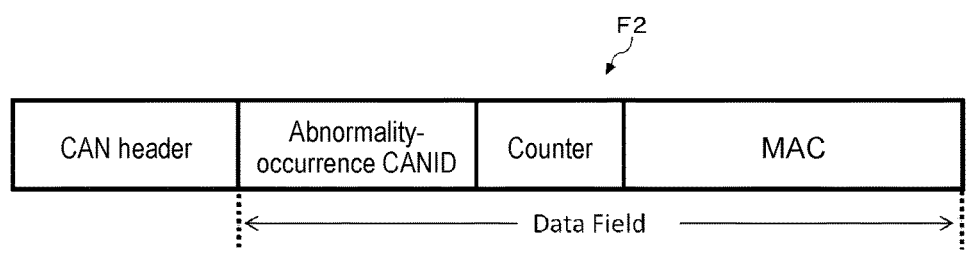
FIG. 18 is a diagram illustrating a format example of an unauthorized-access notification message.

FIG. 18 is a diagram illustrating a format example of an unauthorized-access notification message. The format of an unauthorized-access notification message is the same format as the format of the CAN message in FIG. 1. A CAN header in FIG. 18 corresponds to SOF to DLC in FIG. 1. An abnormality-occurrence CANID, a counter value for preventing retransmission attack, and a MAC are stored in data field F2 in FIG. 18. The MAC is a MAC generated for the CANID and the counter value.

The CANID is a CANID contained in the unauthorized message detected by impersonation detector 34. For the counter value, a number of times of transmitting messages of each CANID in each ECU 100 can be used. Counter value storage 39 stores a number of times of transmitting messages of each CANID as a counter value. That is, each time when a message of a certain CANID is transmitted, a counter value of the CANID is incremented. For a counter value stored in data field F2, a number of times of transmitting abnormality notification messages is used.

A format of data stored in data field F2 of an unauthorized-access notification message is not limited to the example in FIG. 18. For example, a format not containing a counter value is also possible. In this case, counter value storage 39 in FIG. 17 is not necessary. Instead of the counter value, a random number may be used. Data field F2 of an unauthorized-access notification message is sufficient enough to contain information for specifying an abnormality-occurrence CANID, and a format not containing a CANID itself is also possible.

Figure 19:
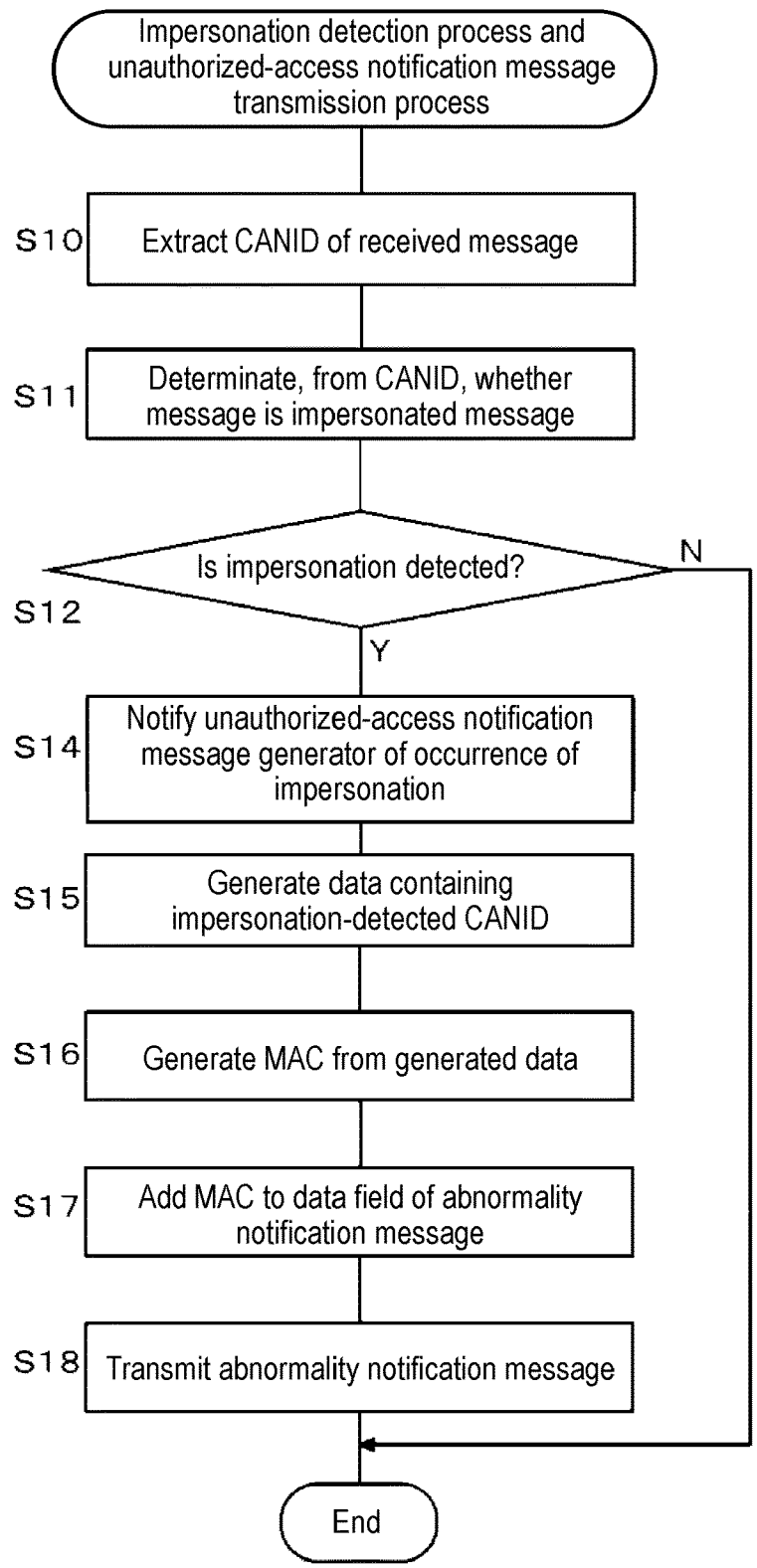
FIG. 19 is a flowchart illustrating an impersonation detection process and an unauthorized-access notification message transmission process performed by the message processor in FIG. 17.

FIG. 19 is a flowchart illustrating an impersonation detection process and an unauthorized-access notification message transmission process by message processor 30 in FIG. 17. Transmitting and receiving unit 50 receives a message from CAN bus 200, and delivers the message to message analyzer 31. CANID extractor 32 extracts a CANID from an ID field of the message received by message analyzer 31 (S10 in FIG. 19). CANID extractor 32 delivers an extracted CANID to impersonation detector 34.

Impersonation detector 34 compares a CANID delivered from CANID extractor 32 with a CANID to be contained in a message that self ECU 100 transmits, and detects impersonation (S11). When both CANIDs coincide with each other, impersonation detector 34 determines that the received message is an impersonated message. If impersonation is detected (Y in S12), impersonation detector 34 notifies unauthorized-access notification message generator 36a of occurrence of impersonation (S14).

Unauthorized-access notification message generator 36a generates data containing an impersonation-detected CANID, stores the data into a data field of an unauthorized-access notification message (S15), and delivers the data to MAC generator 35. The data is generated by, for example, a combination of an impersonation-detected CANID and a counter value expressing a number of times of transmitting messages of the CANID.

MAC generator 35 generates a MAC based on data generated by unauthorized-access notification message generator 36a (S16). MAC generator 35 delivers the generated MAC to unauthorized-access notification message generator 36a. Unauthorized-access notification message generator 36a additionally stores a MAC generated by MAC generator 35 into a data field of an unauthorized-access notification message (S17). Unauthorized-access notification message generator 36a delivers generated unauthorized-access notification message to transmitting and receiving unit 50, and transmitting and receiving unit 50 broadcasts the unauthorized-access notification message to CAN bus 200 (S18).

Figure 20:
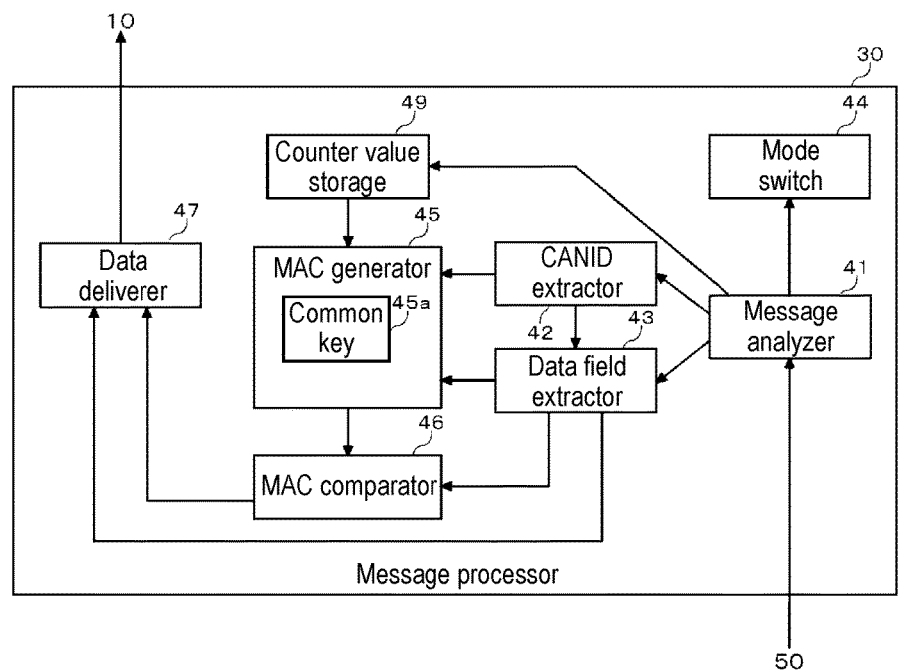
FIG. 20 is a block diagram illustrating functions necessary for unauthorized-access notification message reception performed by the message processor in the scheme for shifting to fail-safe control after abnormality detection.

FIG. 20 is a block diagram illustrating functions necessary for unauthorized-access notification message reception performed by message processor 30 in the scheme for shifting to fail-safe control after abnormality detection. In FIG. 20, functions concerning impersonation detection and message transmission are omitted. Message processor 30 in FIG. 20 has a configuration in which counter value storage 49 is added to message processor 30 in FIG. 15. Counter value storage 49 stores, as the counter value, a number of times of receiving messages of each CANID. That is, each time when a message of a certain CANID is received and MAC verification is successful, a counter value of the CANID is incremented.

Figure 21:
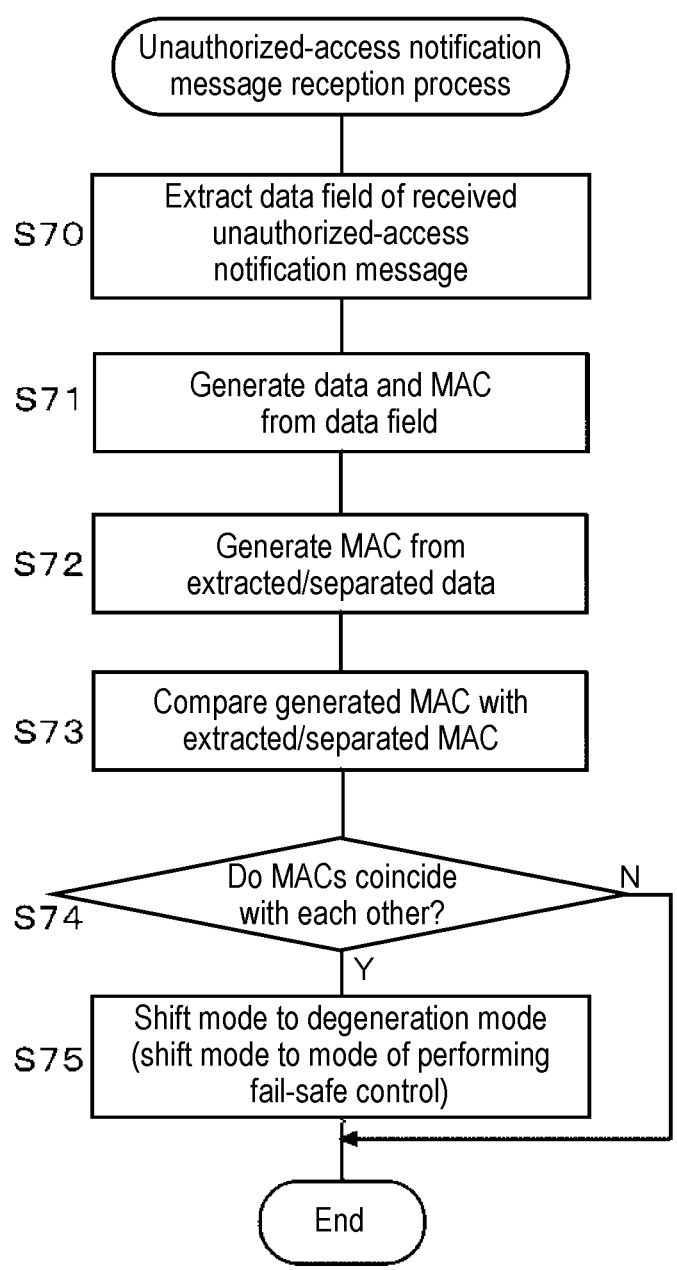
FIG. 21 is a flowchart illustrating an unauthorized-access notification message reception process performed by the message processor in the scheme for shifting to fail-safe control after abnormality detection.

FIG. 21 is a flowchart illustrating an unauthorized-access notification message reception process by message processor 30 in the scheme for shifting to fail-safe control after abnormality detection. Transmitting and receiving unit 50 receives an unauthorized-access notification message from CAN bus 200, and delivers a received unauthorized-access notification message to message analyzer 41. Data field extractor 43 extracts data field of an unauthorized-access notification message received by message analyzer 41 (S70 in FIG. 20). Data field extractor 43 separates data and a MAC contained in the extracted data field (S71). Data field extractor 43 delivers the extracted and separated data to MAC generator 45, and delivers the extracted and separated MAC to MAC comparator 46.

MAC generator 45 generates a MAC, based on an abnormality-occurrence CANID contained in separated data and a counter value of a CANID obtained from counter value storage 49 (S72). MAC generator 45 delivers the generated MAC to MAC comparator 46.

For the counter value, a counter value contained in a data field of a received unauthorized-access notification message may be used as it is. In this case, when a received counter value is larger than a counter value of the CANID obtained from counter value storage 49 and MAC verification is successful, for example, a shift in the counter values between the transmission-side ECU and the reception-side ECU can be prevented, by updating a counter value stored in counter value storage 49 to a value of a received counter value.

Further, security strength can be enhanced by the following content, by not only comparing sizes between a simply received counter value and a counter value of the CANID obtained from counter value storage 49.

That is, updating is performed for only counter values that are within a range in which a received counter value is larger than a counter value of the CANID obtained from counter value storage 49 and is smaller than a value obtained by adding an arbitrary value to the counter value of the CANID obtained from counter value storage 49.

MAC comparator 46 compares a MAC generated by MAC generator 45 with a MAC extracted and separated by data field extractor 43 (S73). If both MACs coincide with each other (Y in S74), mode switch 44 shifts from the ordinary mode to the degeneration mode (fail-safe control) (S75). If the MACs do not coincide with each other (N in S74), mode switch 44 is maintained in the ordinary mode.

Figure 22:
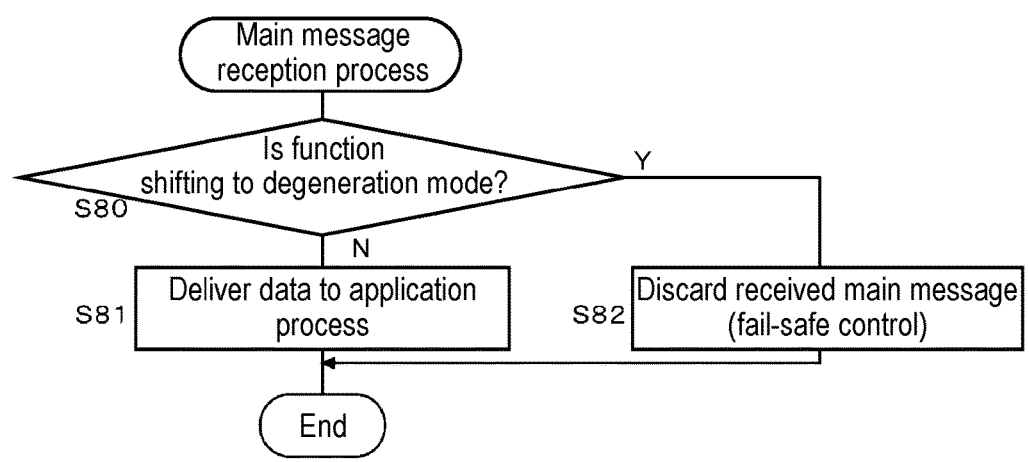
FIG. 22 is a flowchart illustrating a main message reception process performed by the message processor in the scheme for shifting to fail-safe control after abnormality detection.

FIG. 22 is a flowchart illustrating a main message reception process by message processor 30 in the scheme for shifting to fail-safe control after abnormality detection. Transmitting and receiving unit 50 receives a main message from CAN bus 200, and delivers the received main message to message analyzer 41. Upon receiving a main message, message analyzer 41 determines whether a function of a processing object specified by a CANID contained in the message is shifting to the degeneration mode (S80 in FIG. 22). If a function of a processing object is not shifting to the degeneration mode but is in the ordinary mode (N in S80), data contained in a received main message is delivered to application processor 10, and application processor 10 processes a processing object in accordance with delivered data (S81). If a function of a processing object is shifting to the degeneration mode (Y in S80), message analyzer 41 discards a received main message (S82). Fail-safe control is maintained in a function of a processing object specified by a CANID contained in the message.

As described above, according to the present exemplary embodiment, when an impersonated message is detected, a MAC message, a MAC-attached main message, or an unauthorized-access notification message is transmitted. Accordingly, security can be improved without generating and transmitting a MAC each time when a message containing ordinary data is transmitted. Because constant generation of a MAC and a constant transmission process are not necessary, processing load of MAC generation and MAC verification in each ECU 100 can be decreased. Further, increase in an occupation rate of CAN bus 200 can be suppressed.

Further, because an unauthorized-access notification message is generated in a format of an ordinary CAN message, an unauthorized-access notification message can be installed without adding a change to a hardware resource such as a CAN controller and without changing a processing content prescribed by the standard. Accordingly, introduction cost can be minimized.

The present invention is described above based on the exemplary embodiment. The exemplary embodiment has been described for exemplary purposes only, and those skilled in the art concerned can understand that various modifications are possible in the combination of constituent elements and processing processes in the exemplary embodiment, and that these modifications are also within the range of the present invention.

For example, as one of the modifications, the following example is available. That is, in the above exemplary embodiment, the description has been given of details of the "scheme for shifting to fail-safe control" when reception-side ECU 100 has received an unauthorized-access notification message after abnormality detection. On the other hand, the present modification is an example of employing a processing flow in which reception-side ECU 100 shifts to the "scheme for continuing control" when reception-side ECU 100 has received an unauthorized-access notification message.

In this case, function blocks necessary for impersonation detection and unauthorized-access notification message transmission performed by message processor 30, a format example of an unauthorized-access notification message, and a processing flow can be realized by a configuration and a content which are the same as a configuration and a content illustrated in FIG. 17 to FIG. 19 used for describing the above exemplary embodiment. Further, configurations of functions and a processing flow necessary for unauthorized-access notification message reception are also similar to those illustrated in FIG. 20 and FIG. 21.

However, the processes in reception-side ECU 100 are the same as those in step S70 to step S73 illustrated in FIG. 21, in which MAC comparator 46 compares a MAC generated by MAC generator 45 with a MAC extracted and separated by data field extractor 43 (S73). When both MACs coincide with each other, MAC comparator 46 determines that MAC verification is successful, and shifts to the degeneration mode in the "scheme for continuing control".

In the case of shifting to the "scheme for continuing control" after receiving an unauthorized-access notification message, there are a case of separately transmitting a main message and a MAC message and a case of transmitting a MAC-attached main message, from transmission-side ECU 100 after detecting an abnormality. In the case of separately transmitting a main message and a MAC message, configurations of functions and a processing flow necessary for message transmission performed by message processor 30 are similar to those illustrated in FIG. 4 and FIG. 6. In the case of transmitting a MAC-attached main message, configurations of functions and a processing flow necessary for message transmission by message processor 30 are similar to those illustrated in FIG. 13 and FIG. 14.

Further, in reception-side ECU 100, there are a case of receiving first a main message and receiving later a MAC message, a case of receiving first a MAC message and receiving later a main message, and a case of receiving a MAC-attached main message.

In the case of receiving first a main message and receiving later a MAC message, configurations of functions and a processing flow necessary for message reception by message processor 30 are similar to those illustrated in FIG. 7 to FIG. 9.

In the case of receiving first a MAC message and receiving later a main message, configurations of functions and a processing flow necessary for message reception performed by message processor 30 are similar to those illustrated in FIG. 10 to FIG. 12.

In the case of receiving a MAC-attached main message, configurations of functions and a processing flow necessary for message reception performed by message processor 30 are similar to those illustrated in FIG. 15 and FIG. 16.

By employing this modification, security can be also improved in a similar manner to that described in the above exemplary embodiment.

In arbitrary ECU 100 (reception-side ECU 100), in the case of shifting to the "scheme for continuing control" after receiving a plurality of messages, each containing different CANIDs, and after detecting abnormalities in the plurality of messages, ECU 100 may further shift to the "scheme for shifting to fail-safe control" after shifting to the "scheme for continuing control".

In the above exemplary embodiment, the description has been given of the example in which a MAC is transmitted after impersonation is detected. However, reception-side ECU 100 may be configured to shift to fail-safe control in the following cases.

That is, on an assumption that a timing of applying a MAC to a message is shared between transmission-side ECU 100 and reception-side ECU 100, transmission-side ECU 100 periodically transmits a MAC and reception-side ECU 100 is unsuccessful in MAC verification in a timing at which reception-side ECU 100 should essentially receive the MAC.

Alternatively, on an assumption that a timing of applying a MAC to a message is shared between transmission-side ECU 100 and reception-side ECU 100, transmission-side ECU 100 periodically transmits a MAC and transmission-side ECU 100 does not transmit a MAC in a timing at which reception-side ECU 100 should essentially receive the MAC.

Based on these configurations, during the operation of CAN system 500, detection of an abnormal state due to falsification or unauthorized removal to authorized ECU 100, and ensuring of safety become possible.

Alternatively, when CAN system 500 is started and starts communication, a MAC may be applied to a message of a CANID which is transmitted for the first time, and the MAC-attached message may be transmitted. According to this configuration, at a system starting time, detection of an abnormal state due to falsification or unauthorized removal to authorized ECU 100, and ensuring of safety become possible.

In the above exemplary embodiment, as a rule set in advance, it has been described that an event is prescribed that transmission-side ECU 100 does not receive a CANID that ECU 100 essentially transmits, and occurrence of an event against this rule (in this case, reception of a CANID to be essentially transmitted) is occurrence of an abnormality (or an unauthorized access is detected).

When such a rule set (or prescribed) in advance is called a communication rule, many other kinds of communication rules are considered. For example, the following communication rules can be applied.

As an example of a communication rule, in transmission-side ECU 100, a transmission cycle of a message of an arbitrary CANID to CAN bus 200 is held as a communication rule. In the present example, when a transmission cycle of a message of the CANID does not coincide with a cycle set in advance as a communication rule, this message can be detected as an unauthorized message.

As an example of a communication rule, in transmission-side ECU 100, a maximum transmission frequency of a message of an arbitrary CANID to CAN bus 200 is held as a communication rule. In the present example, when transmission frequency of a message of the CANID does not coincide with the maximum frequency set in advance as a communication rule, this message can be detected as an unauthorized message.

As another example of a communication rule, in transmission-side ECU 100, a format of a message of a certain CANID is held as a communication rule. Examples of formats include a data size of a message. In the present example, when a data size of a message of the CANID transmitted to CAN bus 200 does not coincide with a data size set in advance as a communication rule, this can be detected as an unauthorized access.

As another example of communication rules, in transmission-side ECU 100, a data value range contained in a message of a certain CANID and a change amount are held as communication rules. In the present example, when a data value contained in a message of the CANID transmitted to CAN bus 200 does not coincide with a value prescribed in advance as a communication rule, this can be detected as an unauthorized access.

In the above exemplary embodiment, CAN system 500 configured by single CAN bus 200 has been described. Hereinafter, an expansion example of a plurality of CAN systems to an integrated system connected via a gateway device will be described.

In a state that a gateway device intervenes between a plurality of CAN systems, the gateway device becomes a transmitter of a message in some cases.

This case is a transmission of a message from the ECU in an arbitrary CAN system among the plurality of CAN systems to the ECU in other CAN system among the plurality of CAN systems via the gateway device.

This is because the gateway device once receives this message and then retransmits (transfers) this message to the other CAN system. In this case, the gateway device becomes a transmitter of a message to the other CAN system.

Therefore, unlike CAN system 500 configured by single CAN bus 200 described above, the ECU cannot "detect an unauthorized message transmission, by monitoring whether a message of the ID to be transmitted by the self is transmitted by another ECU". On the other hand, in an integrated system having a plurality of CAN systems connected via a gateway device, an ECU can detect an unauthorized message transmission, by utilizing a white list stored in the gateway device. A detail of this configuration will be described below.

Figure 23:
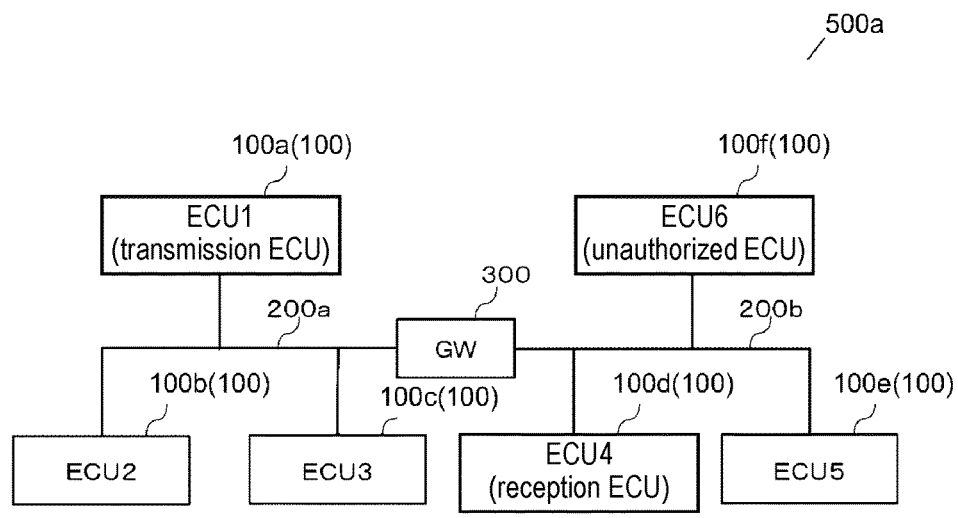
FIG. 23 is a diagram illustrating a configuration example of an integrated system in which two CAN systems are connected to each other via a gateway device.

FIG. 23 is a diagram illustrating a configuration example of an integrated system 500a in which two CAN systems are connected to each other via gateway device 300. ECU1 (100a), ECU2 (100b), and ECU3 (100c) are connected to first CAN bus 200a. ECU4 (100d), ECU5 (100e), and ECU6 (1000 are connected to second CAN bus 200b. Gateway device 300 is connected between first CAN bus 200a and second CAN bus 200b.

Gateway device 300 is disposed between first CAN bus 200a and second CAN bus 200b in order to prevent an increase in the communication traffic, for example. White list 310 is held in gateway device 300. In the white list, a message of which transfer to a different CAN system via gateway device 300 is permitted in advance, a transfer direction of the message (a transmission direction of the message such as "from first CAN bus 200a to second CAN bus 200b" or "from second CAN bus 200b to first CAN bus 200a"), and a CANID of a message are held (stored) by being associated with each other.

Figure 24:
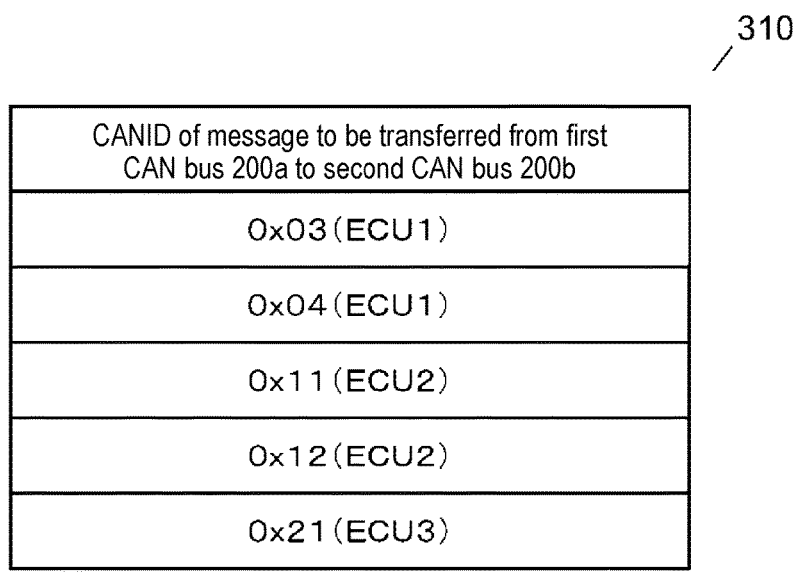
FIG. 24 is a diagram illustrating an example of a white list held in the gateway device in FIG. 23.

FIG. 24 illustrates an example of white list 310 held in gateway device 300 in FIG. 23. In white list 310 in FIG. 24, CANIDs of messages of which transfer from first CAN bus 200a to second CAN bus 200b is permitted are registered. Messages of CANIDs=0x03 and 0x04 are messages generated in ECU1 (100a). Messages of CANIDs=0x11 and 0x12 are messages generated in ECU2 (100b). A message of CANID=0x21 is a message generated in ECU3 (100c). In the illustrated example, transfer directions are all from first CAN bus 200a to second CAN bus 200b (however, as described above, the direction may be individually associated with each message).

When gateway device 300 receives a message of a CANID registered in white list 310 from first CAN bus 200a, gateway device 300 transfers the message to second CAN bus 200b. Specifically, gateway device 300 once receives a message of the CANID transmitted to first CAN bus 200a, and retransmits the message of the CANID to second CAN bus 200b. Therefore, in second CAN bus 200b, gateway device 300 becomes the transmitter of the message.

Hereinafter, there will be considered a case where unauthorized ECU6 (1000 connected to second CAN bus 200b impersonates ECU1 (100a) and transmits a message of CANID=0x03. In the normal state, ECU1 (100a) transmits the message to ECU4 (100d) and ECU5 (100e) via gateway device 300, as a correct case. However, because message transmission from ECU6 (1000 to ECU4 (100d) and ECU5 (100e) is a process in a system connected by second CAN bus 200b as a single CAN bus, a message is never transmitted from ECU6 (1000 to ECU1 (100a) via gateway device 300. Accordingly, gateway device 300 detects impersonation of an unauthorized ECU by utilizing the white list. A detection process of impersonation and a handling process after the detection will be described in detail below.

A first configuration example is that after gateway device 300 detects impersonation, gateway device 300 performs the abnormality handling. That is, in this example, an impersonation detection function and a message transmission function of message processor 30 of ECU 100 are installed in gateway device 300.

Figure 25:
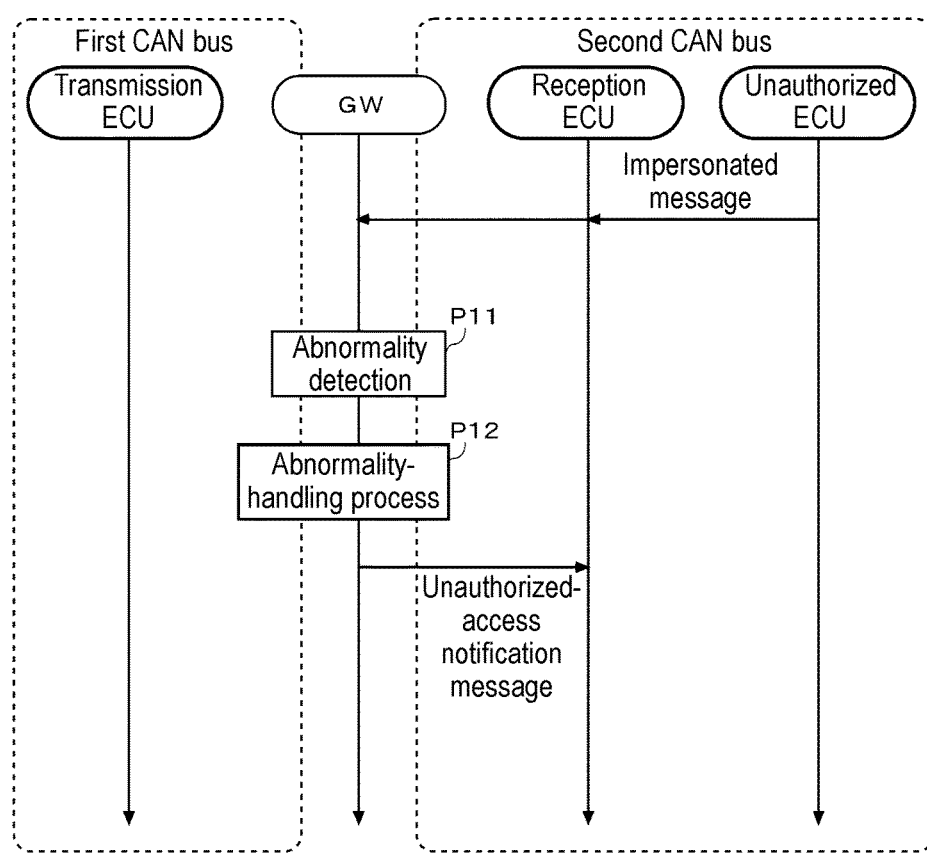
FIG. 25 is a timing chart for explaining a first configuration example of detecting impersonation between different CAN systems in an integrated system.

FIG. 25 is a timing chart for explaining the first configuration example of detecting impersonation between different CAN systems in integrated system 500a. When an unauthorized ECU connected to second CAN bus 200b transmits an impersonated message, gateway device 300 receives the impersonated message and detects an abnormality (P11). Upon detecting an abnormality, gateway device 300 executes an abnormality-handling process (P12). For example, when a message of a CANID that is the same as a CANID registered in white list 310 is received from second CAN bus 200b, this message can be determined as abnormal. Gateway device 300 transmits the above unauthorized-access notification message to second CAN bus 200*b* as the abnormality-handling process.

For the abnormality-handling process, there is also considered a process of transmitting a main message containing authorized data and a MAC message corresponding to the main message. However, according to this method, gateway device 300 needs to collect authorized data concerning each function from ECU1 (100*a*), ECU2 (100*b*), and ECU3 (100*c*). Therefore, for the abnormality-handling process, the process of transmitting the above unauthorized-access notification message is more simple. In the first configuration example, instant responsiveness is high because gateway device 300 detects impersonation and performs the abnormality handling.

A second configuration example is that gateway device 300 transfers an impersonated message to first CAN bus 200*a* to which ECU1 (100*a*) as an authorized transmission ECU is connected, and the authorized transmission ECU performs the abnormality handling. The second configuration example can be realized by setting such that gateway device 300 transfers all messages of CANIDs registered in white list 310 held in gateway device 300, to bi-directions.

Figure 26:
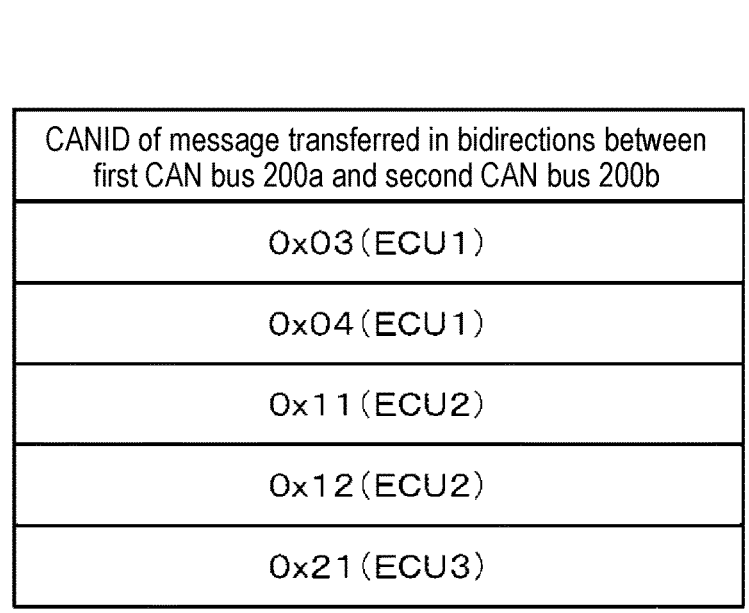
FIG. 26 is a diagram illustrating an example of a white list when a second configuration example for detecting impersonation in an integrated system is employed.

FIG. 26 is a diagram illustrating an example of white list 310 when the second configuration example for detecting impersonation in integrated system 500*a* is employed. Messages of the CANIDs registered in white list 310 are transferred to bi-directions between first CAN bus 200*a* and second CAN bus 200*b*. However, because, ordinarily, a message of the CANID is not transmitted from the ECU connected to second CAN bus 200*b*, a transfer process from second CAN bus 200*b* to first CAN bus 200*a* does not occur. The transfer process from second CAN bus 200*b* to first CAN bus 200*a* occurs only when an unauthorized impersonated message is transmitted from the ECU connected to second CAN bus 200*b*.

Figure 27:
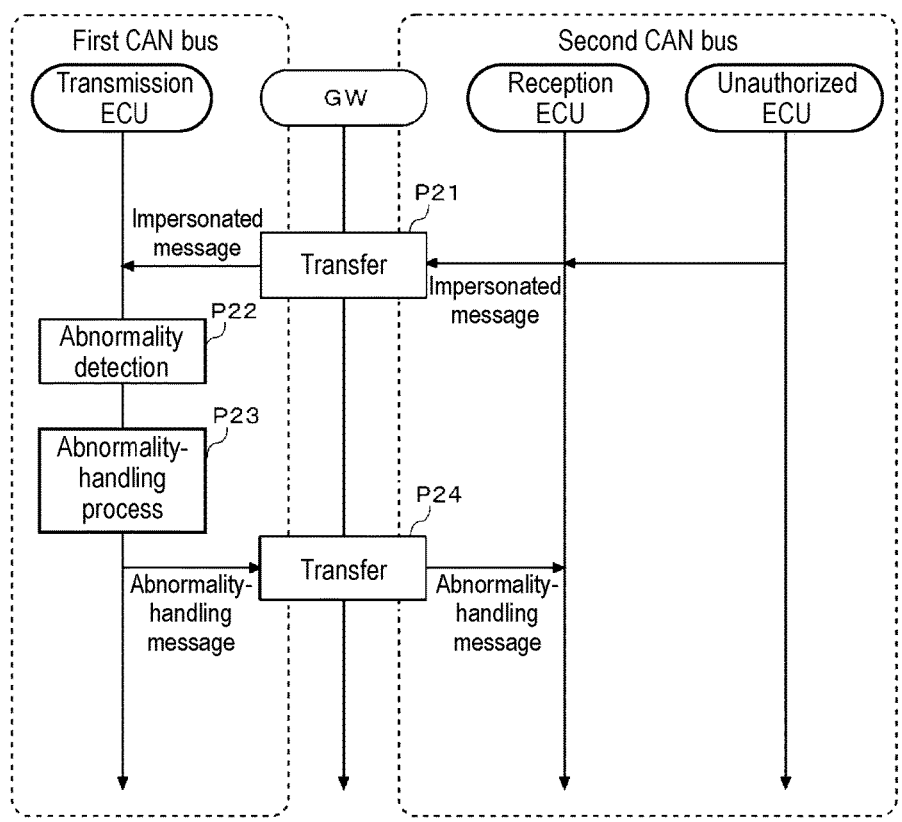
FIG. 27 is a timing chart for explaining a second configuration example of detecting impersonation between different CAN systems in an integrated system.

FIG. 27 is a timing chart for explaining the second configuration example of detecting impersonation between different CAN systems in integrated system 500*a*. When an unauthorized ECU connected to second CAN bus 200*b* transmits an impersonated message, gateway device 300 receives the impersonated message and transfers the impersonated message to first CAN bus 200*a* (P21). ECU1 (100*a*) as the authorized transmission ECU detects an abnormality by detecting the impersonated message (P22) and executes the abnormality-handling process (P23). ECU1 (100*a*) transmits an abnormality-handling message such as a message containing authorized data, and gateway device 300 receives the abnormality-handling message and transfers the abnormality-handling message to second CAN bus 200*b* (P24). In the second configuration example, by only improving white list 310, addition of a function of gateway device 300 can be minimized.

A third configuration example is that gateway device 300 detects impersonation and notifies ECU1 (100*a*) as the authorized transmission ECU of the impersonation, and the authorized transmission ECU performs the abnormality handling. An impersonation detection function of message processor 30 of ECU 100 is installed in gateway device 300. Gateway device 300 is also assumed to hold white list 310 in FIG. 23.

Figure 28:
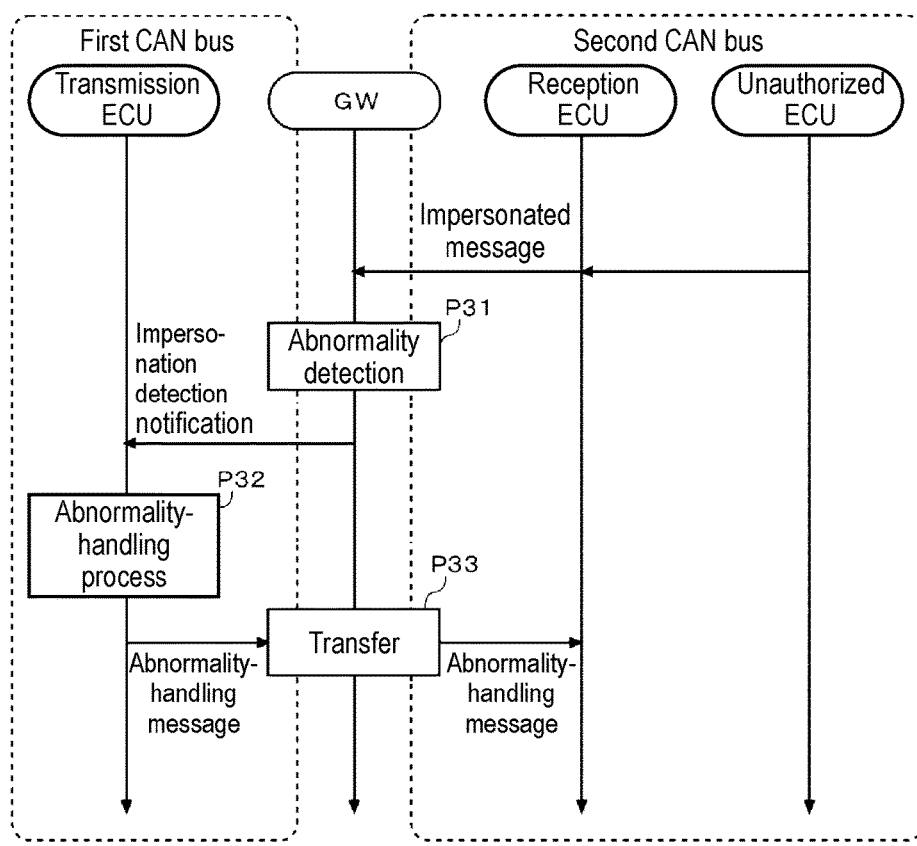
FIG. 28 is a timing chart for explaining a third configuration example of detecting impersonation between different CAN systems in an integrated system.

FIG. 28 is a timing chart for explaining the third configuration example of detecting impersonation between different CAN systems in integrated system 500*a*. When an unauthorized ECU connected to second CAN bus 200*b* transmits an impersonated message, gateway device 300 receives the message and detects an abnormality (P31). Upon detecting the abnormality, gateway device 300 transmits an impersonation detection notification to ECU1 (100*a*) as the authorized transmission ECU. This impersonation detection notification is a message newly generated by gateway device 300. The message is a message based on the format of the CAN message.

Upon receiving the impersonation detection notification, ECU1 (100*a*) executes the abnormality-handling process (P32). ECU1 (100*a*) transmits an abnormality-handling message such as a message containing authorized data, and gateway device 300 receives the abnormality-handling message and transfers the abnormality-handling message to second CAN bus 200*b* (P33). In the third configuration example, the abnormality-handling process can be handled by the authorized transmission ECU, without rewriting white list 310.

The outline of one aspect of the present invention is as follow. A certain aspect of the present invention is a transmission device. This device has a detector, a generator, and a transmitter. The detector detects whether a communication rule of the message held by the present transmission device coincides with a communication rule of a message that has been broadcasted to a network by another transmission device. The generator generates an abnormality notification message for notifying detection of an abnormality. The transmitter broadcasts to the network the message generated by the generator. When the detector has detected that a communication rule of a message that is broadcasted to the network by the present transmission device coincides with a communication rule of a message that has been broadcasted to the network by another transmission device, the generator generates the abnormality notification message. Then, the transmitter broadcasts an abnormality notification message to the network.

According to this aspect, when a message of a communication rule that coincides with a communication rule of a message held by the self is received, an unauthorized-access notification message is transmitted, and the other devices connected to the network are notified of occurrence of an unauthorized access, so that security of the other devices can be improved. Further, a detection process of an unauthorized message and a transmission process of an unauthorized-access notification message are light-load processes, and can suppress an increase in load of the transmission device.

Another aspect of the present invention is also a transmission device. This device has a detector, a generator, and a transmitter. The detector detects whether identification information to be contained in a message that is broadcasted to a network by the present transmission device coincides with identification information contained in a message that has been broadcasted to the network by another transmission device. The generator generates an abnormality notification message for notifying detection of an abnormality. The transmitter broadcasts to the network the message generated by the generator. When the detector has detected that identification information to be contained in the message that is broadcasted to the network by the present transmission device coincides with identification information contained in a message that has been broadcasted to the network by another transmission device, the generator generates an abnormality notification message. Then, the transmitter broadcasts an abnormality notification message to the network. The "identification information" may be a CANID. The "detector" may be impersonation detector 34 in FIG. 17. The "generator" may be an unauthorized-access notification message generator 36*a* in FIG. 17, may be the main message generator in FIG. 13, or may be MAC message generator 38 in FIG. 4. The "transmitter" may be transmitting and receiving unit 50 in FIG. 3.

According to this aspect, when a message containing identification information which should be contained in a message that the self transmits is received, an unauthorized-access notification message is transmitted. By notifying the other devices connected to the network of occurrence of an unauthorized access, security of the other devices can be improved. Further, a detection process of an unauthorized message and a transmission process of an unauthorized-access notification message are light-load processes, and can suppress an increase in load of the transmission device.

Another aspect of the present invention is also a transmission device. This device has a first generator, a second generator, and a transmitter. When identification information to be contained in a message that is broadcasted to the network by the present transmission device coincides with identification information contained in a message that has been broadcasted to the network by another transmission device, the first generator generates a message containing the identification information and authorized data concerning a notification matter of a processing object specified in the identification information. The second generator generates a message authentication code for at least the authorized data. The transmitter broadcasts to the network the message generated by the first generator, and the message authentication code generated by the second generator. The "identification information" may be a CANID. The "first generator" may be main message generator 36 in FIG. 4. The "second generator" may be MAC generator 35 in FIG. 4. The "transmitter" may be transmitting and receiving unit 50 in FIG. 3.

According to this aspect, when a message containing identification information which should be contained in a message that the self transmits is received, a message containing authorized data and a MAC are transmitted. By notifying the other devices connected to the network of occurrence of an unauthorized access, security of the other devices can be improved. In other cases, an increase in load of the transmission device can be suppressed, by not generating and transmitting a MAC.

Another aspect of the present invention is also a transmission device. This device has a message generator and a transmitter. The message generator generates a message containing identification information related to a specific notification matter of a specific processing object and data concerning the notification matter. The transmitter broadcasts to the network the message generated by the message generator. When identification information to be contained in a message that is broadcasted to the network by the present transmission device coincides with identification information contained in a message that has been broadcasted to the network by another transmission device, the message generator generates, in a format identical with a format of an ordinary message, an unauthorized-access notification message for notifying that a message containing the identification information is an unauthorized message. Then, the transmitter broadcasts an unauthorized-access notification message to the network. The "identification information" may be a CANID. The "message generator" may be unauthorized-access notification message generator 36a in FIG. 17. The "transmitter" may be transmitting and receiving unit 50 in FIG. 3.

According to this aspect, when a message containing identification information which should be contained in a message that the self transmits is received, an unauthorized-access notification message is transmitted. By notifying the other devices connected to the network of occurrence of an unauthorized access, security of the other devices can be improved. Further, a detection process of an unauthorized message and a transmission process of an unauthorized-access notification message are light-load processes, and can suppress an increase in load of the transmission device.

The transmission device may further have a message authentication code generator that generates a message authentication code for at least identification information. The message generator may contain, in an unauthorized-access notification message, a message authentication code generated by the message authentication code generator. The "message authentication code generator" may be MAC generator 35 in FIG. 17.

According to this aspect, reliability of an unauthorized-access notification message can be improved by containing a MAC in the unauthorized-access notification message.

Still another aspect of the present invention is a reception device. This device has a receiver and a processor. The receiver receives from a network a message containing identification information related to a specific notification matter of a specific processing object and data concerning the notification matter. The processor processes the message received by the receiver. When the receiver has received from the network a message authentication code for authenticating the message, the processor switches a mode of validating data contained in a message without verification using the message authentication code to a mode of validating data contained in a message under a condition that verification using the message authentication code is successful. The "identification information" may be a CANID. The "receiver" may be transmitting and receiving unit 50 in FIG. 3. The "processor" may be message processor 30 in FIG. 7.

According to this aspect, due to reception of a MAC, by switching a mode of validating data without verification using a MAC to a mode of validating the data under a condition that verification using a MAC is successful, security can be improved while suppressing an increase in load of the reception device.

Yet another aspect of the present invention is also a reception device. This device has a receiver and a processor. The receiver receives from a network a message containing identification information related to a specific notification matter of a specific processing object and data concerning the notification matter. The processor processes the message received by the receiver. When the receiver receives from the network a message for notifying that the message containing identification information is an unauthorized message as an unauthorized-access notification message generated in a format identical with a format of the ordinary message, the processor switches a mode to a mode of invalidating the data contained in a message containing the identification information. The "identification information" may be a CANID. The "receiver" may be transmitting and receiving unit 50 in FIG. 3. The "processor" may be message processor 30 in FIG. 20.

According to this aspect, when an unauthorized-access notification message is received, by switching a mode to a mode of invalidating data contained in a message containing identification information notified by the unauthorized-access notification message, security can be improved while suppressing an increase in load of the reception device.

When an unauthorized-access notification message contains a message authentication code for at least identification information, the processor may switch a mode to a mode of invalidating the data contained in the message containing the identification information under a condition that verification using a message authentication code is successful.

According to this aspect, by switching a mode to a mode of invalidating data contained in a message containing identification information notified by an unauthorized-access notification message, under a condition that MAC verification is successful, reliability of a mode switch process can be improved.

Another aspect of the present invention is also a reception device. This device has a receiver and a processor. The receiver receives from the network a message containing identification information related to a specific notification matter of a specific processing object and data concerning the notification matter. The processor processes the message received by the receiver. When the message received by the receiver from the network is a message for notifying that a message containing identification information is an unauthorized message, as an unauthorized-access notification message generated in a format identical with a format of an ordinary message, and when an unauthorized-access notification message contains a message authentication code for at least identification information, the processor switches a mode of validating, without verification of the message authentication code, data contained in a message containing the identification information under a condition that verification using a message authentication code is successful to a mode of validating the data contained in the message containing the identification information under the condition that the verification using the message authentication code is successful. The "identification information" may be a CANID. The "receiver" may be transmitting and receiving unit 50 in FIG. 3. The "processor" may be message processor 30 in FIG. 20.

According to this aspect, when an unauthorized-access notification message is received, by switching a mode of validating data contained in a message containing the MAC without MAC verification under a condition that MAC verification is successful to a mode of validating the data under a condition that MAC verification is successful, security can be improved while suppressing an increase in load of the reception device.

Still another aspect of the present invention is a transmission method. This method has a first step, a second step, and a third step. In the first step, when identification information to be contained in a message that is broadcasted to a network by the present transmission device coincides with identification information contained in a message that has been broadcasted to the network by another transmission device, there is generated a message containing the identification information and authorized data concerning a notification matter of a processing object specified by the identification information. In the second step, a message authentication code for at least the authorized data is generated. In the third step, the message generated in the first step and the message authentication code generated in the second step are broadcasted to the network.

According to this aspect, when a message containing identification information which should be contained in a message that the self transmits is received, a message containing authorized data and a MAC are transmitted. By notifying the other devices connected to the network of occurrence of an unauthorized access, security of the other devices can be improved. In other cases, an increase in load of the transmission device can be suppressed, by not generating and transmitting a MAC.

Still another aspect of the present invention is a transmission method. This method has a first step and a second step. In the first step, there is generated a message containing identification information related to a specific notification matter of a specific processing object and data concerning the notification matter. In the second step, the message generated in the first step is broadcasted to the network. In the first step, when the identification information to be contained in a message that is broadcasted to the network by the present transmission device coincides with identification information contained in a message that has been broadcasted to the network by another transmission device, an unauthorized-access notification message for notifying that a message containing the identification information is an unauthorized message is generated in a format identical with a format of an ordinary message. In the second step, an unauthorized-access notification message is broadcasted to the network.

According to this aspect, when a message containing identification information which should be contained in a message that the self transmits is received, an unauthorized-access notification message is transmitted. By notifying the other devices connected to the network of occurrence of an unauthorized access, security of the other devices can be improved. Further, a detection process of an unauthorized message and a transmission process of an unauthorized-access notification message are light-load processes, and can suppress an increase in load of the transmission device.

Still another aspect of the present invention is a reception method. This method has a first step and a second step. In the first step, there is received from the network a message containing identification information related to a specific notification matter of a specific processing object and data concerning the notification matter. In the second step, the message received in the first step is processed. In the first step, when a message authentication code for at least the identification information contained in a message is received from the network, in the second step, a mode of validating data contained in a message without verification using the message authentication code is switched to a mode of validating the data contained in a message under a condition that the verification using the message authentication code is successful.

According to this aspect, due to reception of a MAC, by switching a mode of validating data without verification using a MAC to a mode of validating the data under a condition that verification using a MAC is successful, security can be improved while suppressing an increase in load of the reception device.

Still another aspect of the present invention is also a reception method. This method has a first step and a second step. In the first step, there is received from the network a message containing identification information related to a specific notification matter of a specific processing object and data concerning the notification matter. In the second step, the message received in the first step is processed. In the first step, when there is received from the network a unauthorized-access notification message that is a message for notifying that the message containing identification information is an unauthorized message and generated in a format identical with a format of an ordinary message, in the second step, a mode is switched to a mode of invalidating the data contained in the message containing the identification information.

According to this aspect, when an unauthorized-access notification message is received, by switching a mode to a mode of invalidating data contained in a message containing identification information notified by the unauthorized-access notification message, security can be improved while suppressing an increase in load of the reception device.

INDUSTRIAL APPLICABILITY

The present invention can be utilized for a CAN.

REFERENCE MARKS IN THE DRAWINGS

10: application processor
30: message processor
31: message analyzer
32: CANID extractor
34: impersonation detector
35: MAC generator
35a: common key
36: main message generator
36a: unauthorized-access notification message generator
37: data field extractor
38: MAC message generator
39: counter value storage
41: message analyzer
42: CANID extractor
43: data field extractor
44: mode switch
45: MAC generator
45a: common key
46: MAC comparator
47: data deliverer
48: main message temporary holder
48a: MAC message temporary holder
49: counter value storage
50: transmitting and receiving unit
100, 100a, 100b, 100c, 100d, 100e, 100f ECU
200: CAN bus
200a: first CAN bus
200b: second CAN bus
300: gateway device
310: white list
500: CAN system
500a: integrated system

The invention claimed is:

1. A transmission device for a controller area network (CAN), the transmission device comprising:
at least one memory that stores instructions and a plurality of identifiers; and
a processor that, when executing the instructions stored in the at least one memory, performs operations comprising:
receiving a first message broadcast by an unauthorized transmission device via the CAN, the first message including a first identifier and unauthorized data;
comparing the first identifier with the plurality of identifiers stored in the at least one memory, the plurality of identifiers corresponding to notification matters of a processing object connected to the transmission device;
determining the first message to be unauthorized and obtaining authorized data from the processing object when the first identifier corresponds to one of the plurality of identifiers, the authorized data concerning a notification matter, of the processing object, specified by the first identifier;
generating a second message including the first identifier and the authorized data, and a message authentication code for at least the authorized data; and
broadcasting the second message and the message authentication code to the CAN.

2. A system, comprising:
the transmission device according to claim 1; and
a reception device connected with the transmission device, the reception device including:
at least one second memory that stores second instructions; and
a second processor that, when executing the second instructions stored in the at least one second memory, performs second operations comprising:
receiving the second message and the message authentication code; and
switching a first mode to a second mode, wherein the first mode validates data contained in the second message without verification using the message authentication code, and the second mode validates data contained in the second message under a condition that verification using the message authentication code is successful.

3. A transmission method for a transmission device connected to a controller area network (CAN), the transmission method comprising:
receiving a first message broadcast by an unauthorized transmission device via the CAN, the first message including a first identifier and unauthorized data;
comparing the first identifier with a plurality of identifiers, the plurality of identifiers corresponding to notification matters of a processing object connected to the transmission device;
determining, by a processor of the transmission device, the first message to be unauthorized and obtaining authorized data from the processing object when the first identifier corresponds to one of the plurality of identifiers, the authorized data concerning a notification matter, of the processing object, specified by the first identifier;
generating a second message including the first identifier and the authorized data, and a message authentication code for at least the authorized data; and
broadcasting the second message and the message authentication code to the CAN.

4. The transmission method according to claim 3, further for a reception device connected to the transmission device, the transmission method further comprising:
receiving, by the reception device, the second message and the message authentication code; and
switching, by the reception device, a first mode to a second mode, wherein the first mode validates data contained in the second message without verification using the message authentication code, and the second mode validates data contained in the second message under a condition that verification using the message authentication code is successful.

* * * * *